US012482040B2

(12) United States Patent
Chourasiya et al.

(10) Patent No.: US 12,482,040 B2
(45) Date of Patent: Nov. 25, 2025

(54) DISTRIBUTED ASSETS MANAGEMENT PLATFORM

(71) Applicant: Stripe, Inc., South San Francisco, CA (US)

(72) Inventors: Devesh Chourasiya, Mountain View, CA (US); Andrew Straussman, Plymouth, MN (US); Sumeet Bedi, Kirkland, WA (US); Ville-Jalmari Koskela, Redmond, WA (US)

(73) Assignee: STRIPE, INC., South San Francisco, CA (US)

( * ) Notice: Subject to any disclaimer, the term of this patent is extended or adjusted under 35 U.S.C. 154(b) by 33 days.

(21) Appl. No.: 18/540,626

(22) Filed: Dec. 14, 2023

(65) Prior Publication Data
US 2025/0200662 A1    Jun. 19, 2025

(51) Int. Cl.
G06Q 40/06    (2012.01)
G06Q 40/04    (2012.01)

(52) U.S. Cl.
CPC .............. G06Q 40/06 (2013.01); G06Q 40/04 (2013.01)

(58) Field of Classification Search
CPC ............................. G06Q 40/06; G06Q 40/04
USPC ....................................................... 705/35–45
See application file for complete search history.

(56) References Cited

U.S. PATENT DOCUMENTS

| 5,224,162 A | 6/1993 | Okamoto et al. |
| 7,047,404 B1 | 5/2006 | Doonan et al. |
| 8,014,762 B2 | 9/2011 | Chmaytelli et al. |
| 8,645,213 B2 | 2/2014 | Granbery et al. |
| 9,735,965 B1 | 8/2017 | Shavell |
| 10,460,298 B1 | 10/2019 | Ran et al. |
| 2003/0158960 A1 | 8/2003 | Engberg |
| 2006/0065717 A1 | 3/2006 | Hurwitz et al. |
| 2006/0143231 A1 | 6/2006 | Boccasam et al. |
| 2006/0174352 A1 | 8/2006 | Thibadeau |
| 2007/0100748 A1 | 5/2007 | Dheer |
| 2008/0071625 A1 | 3/2008 | Arumugam |

(Continued)

OTHER PUBLICATIONS

International search Report and written opinion received for PCT application No. PCT/US24/60207, mailed on Apr. 11, 2025, 19 pages.

(Continued)

Primary Examiner — Robert R Niquette
(74) Attorney, Agent, or Firm — Womble Bond Dickinson (US) LLP

(57) ABSTRACT

Disclosed herein are methods and systems for a digital platform to manage data related to the movement of assets between accounts. In one embodiment, the platform receives a continuous stream of messages, each indicating a transfer of assets between accounts. The platform verifies the messages to ensure that no digital information is missing. Once a message is verified as complete, the platform generates a liquidity event message to manage the regular transfer of assets between accounts, based on certain conditions (e.g., account balances). The liquidity event message is sent to another part of the platform, known as the liquidity engine, which then carries out the asset transfers as described in the message. Thereby, the workload of receiving, checking, completing, and acting on messages about asset transfers is bifurcated to ensure efficient and controlled movement of assets within the digital platform.

20 Claims, 13 Drawing Sheets

(56) References Cited

U.S. PATENT DOCUMENTS

| | | |
|---|---|---|
| 2009/0083181 A1 | 3/2009 | Bishop |
| 2009/0132813 A1 | 5/2009 | Schibuk |
| 2009/0234660 A1 | 9/2009 | Berneman et al. |
| 2011/0231272 A1 | 9/2011 | Englund et al. |
| 2012/0150714 A1* | 6/2012 | Agbor .............. G06Q 40/04 705/37 |
| 2012/0191579 A1 | 7/2012 | Ahn et al. |
| 2012/0260322 A1 | 10/2012 | Logan et al. |
| 2013/0103576 A1 | 4/2013 | Ackley |
| 2013/0144731 A1 | 6/2013 | Baldwin et al. |
| 2013/0238489 A1 | 9/2013 | Bouey et al. |
| 2013/0238490 A1 | 9/2013 | Bouey et al. |
| 2013/0268440 A1 | 10/2013 | Tierney et al. |
| 2013/0332324 A1 | 12/2013 | Mischell et al. |
| 2014/0129432 A1 | 5/2014 | Hanson et al. |
| 2014/0270172 A1 | 9/2014 | Peirce |
| 2014/0316983 A1 | 10/2014 | Block et al. |
| 2015/0154570 A1 | 6/2015 | Dheer |
| 2016/0292788 A1* | 10/2016 | Grasso .............. G06Q 40/06 |
| 2016/0321625 A1 | 11/2016 | Gilliam et al. |
| 2018/0068389 A1 | 3/2018 | Pessin |
| 2018/0096329 A1 | 4/2018 | Hamilton et al. |
| 2018/0158116 A1 | 6/2018 | Hoang et al. |
| 2018/0330342 A1 | 11/2018 | Prakash |
| 2019/0180351 A1 | 6/2019 | Seabaugh et al. |
| 2019/0266607 A1 | 8/2019 | Mori et al. |
| 2019/0378100 A1 | 12/2019 | Muthu et al. |
| 2019/0378132 A1 | 12/2019 | Gilliam et al. |
| 2020/0051170 A1 | 2/2020 | Lutnick |
| 2020/0151726 A1 | 5/2020 | Song et al. |
| 2020/0226687 A1* | 7/2020 | Krishna ............ H04L 9/0643 |
| 2021/0224759 A1 | 7/2021 | Zorzano Blasco |
| 2022/0188917 A1 | 6/2022 | Petersen et al. |
| 2022/0398646 A1 | 12/2022 | Saunders |
| 2023/0021606 A1 | 1/2023 | Zhang et al. |
| 2023/0214832 A1 | 7/2023 | Hu |

OTHER PUBLICATIONS

Du, Lingling, "Financial Decision Support System Research Based on Data Warehouse," 2009 International Conference on Information Management, Innovation Management and Industrial Engineering, IEEE, Computer Society, 2009, pp. 23-26.

Li et al., "How people select their payment methods in online auctions? An exploration of eBay transactions," Proceedings of the 37th Hawaii International Conference on System Sciences, 2004, pp. 1-10.

Non-Final Office Action received for U.S. Appl. No. 18/540,619, mailed on May 5, 2025, 8 pages.

Non-Final Office Action received for U.S. Appl. No. 18/540,634, mailed on Apr. 14, 2025, 16 pages.

Non-Final Office Action received for U.S. Appl. No. 18/540,638, mailed on May 8, 2025, 12 pages.

Non-Final Office Action received for U.S. Appl. No. 18/540,639, mailed on Apr. 9, 2025, 8 pages.

Non-Final Office Action for U.S. Appl. No. 18/540,633, mailed Jul. 31, 2025, 35 pages.

Notice of Allowance for U.S. Appl. No. 18/540,638, mailed Sep. 15, 2025, 18 pages.

Corrected Notice of Allowability for U.S. Appl. No. 18/540,638, mailed Sep. 17, 2025, 8 pages.

Final Office Action for U.S. Appl. No. 18/540,634, mailed Sep. 17, 2025, 20 pages.

* cited by examiner

DISTRIBUTED ASSETS MANAGEMENT PLATFORM

CROSS-REFERENCE TO RELATED APPLICATIONS

The present application is related to the following co-pending applications filed on the same day as the present application:

U.S. patent application Ser. No. 18/540,633, titled "Assets Interface of a Distributed Assets Management Platform"

U.S. Patent App. No. 18/540,630, titled "Hydration System in a Distributed Assets Management Platform";

U.S. Patent App. No. 18/540,638, titled "Exchange Platform in a Distributed Assets Management Platform";

U.S. Patent App. No. 18/540,634, titled "Machine-Learning Based Delay Prediction"; and U.S. Patent App. No. 18/540,619, titled "Data Aggregation for Thresholding-Based Account Management".

Each of the above applications are incorporated by reference herein in their entirety for any purpose.

BACKGROUND

Modern distributed computing systems typically provide a number of services to their users, where each service may have its own execution. Commerce platforms employ such distributed computing systems where the services operate independently of one another, as well as interact with one another, to enable each of the various services offerings of the commerce platform. The execution of the services may have an impact on assets of the commerce platform. In some examples, a commerce platform may maintain hundreds of accounts for different service and/or entities (e.g., legal, juristic, or other divisions of the commerce platform) distributed among a plurality of real world locations. Then, execution of the services at scale, such as millions to billions of service operations each day, creates a significant computational problem of managing the movement of assets in response to the service operations executed by the various, distributed, and independently operating services of the commerce platform. Furthermore, for distributed computing systems, where each service has its own underlying execution, providing compatibility to a multitude of services is a complex technical problem. That is, determining when and how to manage assets of the commerce platform, whether operations performed by services that cause such asset movements are allowable, whether the asset movements might trigger a change of asset types, how different services can report events related to assets of the commerce platform reliability and accurately, etc. in a distributed computer system at scale and in a timely manner is a computationally complex problem that needs to be addressed.

SUMMARY

Example methods are disclosed herein. An example method of managing data by a distributed assets management platform includes receiving, at an assets interface of the distributed assets management platform, a stream of event messages, wherein each event message of the stream of event messages is associated with at least one asset movement between accounts of a commerce platform and is associated with a service causing the at least one asset movement between the accounts; for a first event message of the stream of event messages: determining, by the assets interface, whether the first event message includes incomplete information; in response to a determination that the first event message includes incomplete information: registering, by a hydration system of the distributed assets management platform, at least one data field of the incomplete information associated with the first event message, and storing the first event message; updating, by the hydration system, a data update to the at least one data field with updated information to transform the first event message into a completed event message; generating, by the assets interface, a liquidity event message based on the completed event message for a periodic movement of assets between the accounts of the commerce platform based on one or more conditions associated with balances of the accounts of the commerce platform, the assets interface further transmitting the liquidity event message to a liquidity engine of the distributed assets management platform; and executing, by the liquidity engine, in response to receipt of the liquidity event message, the periodic movement of assets between the accounts of the commerce platform.

An example method for providing an interface to a plurality of services includes receiving, by an assets interface of a distributed assets management platform, an event message associated with an operation requesting an asset movement between accounts of a commerce platform, the event message having a plurality of data fields corresponding to the asset movement and a first identifier; accessing, by the assets interface, a configuration for the asset movement based on account identifiers for the accounts as defined in the plurality of data fields, the configuration defining one or more legs for execution of the asset movement; transforming, by the assets interface, the event message to one or more asset movements corresponding to the one or more legs defined in the configuration; generating, by the assets interface, one or more corresponding sub movement event messages for the one or more legs; and transmitting, by the assets interface, at least one of the one or more corresponding sub movement event messages to a liquidity engine causing one or more asset movements between the accounts of the commerce platform.

An exemplary method for hydration of an event message data at a distributed assets management platform includes receiving, by a hydration system from an assets interface, a registration request associated with an event message, the event message identified by a first identifier and including a placeholder value for a data field of the event message that is unknown at a time the event message is generated; receiving, from a first hydration data source, a candidate identifier and a set of data corresponding to the candidate identifier; determining that the first identifier matches the candidate identifier; and in response to determining that the first identifier matches the candidate identifier, updating, by the hydration system, the data field with a first data value of the set of data.

An exemplary method for method for asset exchange management includes receiving, by an application programming interface (API) endpoint of an exchange platform, an API event message that defines a first amount of a first type of asset and a second amount of a second type of asset; processing, by an aggregator of the exchange platform, the API event message to accumulate a total amount of the first type of asset and a total amount of the second type of asset in response to receipt of the API event message; detecting, by an exchange manager of the exchange platform, when at least one of the total amount of the first type of asset and the total amount of the second type of asset satisfies a condition defining when a second amount of the first type of asset is to be converted to the second type of asset; and in response to detecting satisfaction of the condition, initiating a process by which a remote system converts the second amount of the first type of asset to the second type of asset.

Exemplary non-transitory machine readable media are disclosed herein. An example non-transitory machine readable medium has instructions stored thereon, which when executed by a processing system, causes the processing system to perform operations of a distributed assets management platform, the operations comprising: receiving, at an assets interface of the distributed assets management platform, a stream of event messages, wherein each event message of the stream of event messages is associated with at least one asset movement between accounts of a commerce platform and is associated with a service causing the at least one asset movement between the accounts; for a first event message of the stream of event messages: determining, by the assets interface, whether the first event message includes incomplete information; in response to a determination that the first event message includes incomplete information: registering, by a hydration system of the distributed assets management platform, at least one data field of the incomplete information associated with the first event message, and storing the first event message; updating, by the hydration system, a the at least one data field with updated information to transform the first event message into a completed event message; generating, by the assets interface, a liquidity event message based on the completed event message for a periodic movement of assets between the accounts of the commerce platform based on one or more conditions associated with balances of the accounts of the commerce platform, the assets interface further transmitting the liquidity event message to a liquidity engine of the distributed assets management platform; and executing, by the liquidity engine, in response to receipt of the liquidity event message, the periodic movement of assets between the accounts of the commerce platform.

An exemplary non-transitory machine readable medium has instructions stored thereon, which when executed by a processing system, causes the processing system to perform operations of a distributed assets management platform, the operations comprising: receiving, by an assets interface of a distributed assets management platform, an event message associated with an operation requesting an asset movement between accounts of a commerce platform, the event message having a plurality of data fields corresponding to the asset movement and a first identifier; accessing, by the assets interface, a configuration for the asset movement based on account identifiers for the accounts as defined in the plurality of data fields, the configuration defining one or more legs for execution of the asset movement; transforming, by the assets interface, the event message to one or more asset movements corresponding to the one or more legs defined in the configuration; generating, by the assets interface, one or more corresponding sub movement event messages for the one or more legs; and transmitting, by the assets interface, at least one of the one or more corresponding sub movement event messages to a liquidity engine causing one or more asset movements between the accounts of the commerce platform.

An exemplary non-transitory machine readable medium has instructions stored thereon, which when executed by a processing system, causes the processing system to perform operations of a distributed assets management platform, the operations comprising: receiving, by a hydration system from an assets interface, a registration request associated with an event message, the event message identified by a first identifier and including a placeholder value for a data field of the event message that is unknown at a time the event message is generated; receiving, from a first hydration data source, a candidate identifier and a set of data corresponding to the candidate identifier; determining that the first identifier matches the candidate identifier; and in response to determining that the first identifier matches the candidate identifier, updating, by the hydration system, the data field with a first data value of the set of data.

An exemplary non-transitory machine readable medium has instructions stored thereon, which when executed by a processing system, causes the processing system to perform operations of a distributed assets management platform, the operations comprising: receiving, by an application programming interface (API) endpoint of an exchange platform, an API event message that defines a first amount of a first type of asset and a second amount of a second type of asset; processing, by an aggregator of the exchange platform, the API event message to accumulate a total amount of the first type of asset and a total amount of the second type of asset in response to receipt of the API event message; detecting, by an exchange manager of the exchange platform, when at least one of the total amount of the first type of asset and the total amount of the second type of asset satisfies a condition defining when a second amount of the first type of asset is to be converted to the second type of asset; and in response to detecting satisfaction of the condition, initiating a process by which a remote system converts the second amount of the first type of asset to the second type of asset.

Exemplary systems are disclosed herein. An example system includes a non-transitory memory storing instructions; and a processing system coupled with the memory and configured to execute the instructions causing the system to perform operations, the operations comprising: receiving, at an assets interface of the distributed assets management platform, a stream of event messages, wherein each event message of the stream of event messages is associated with at least one asset movement between accounts of a commerce platform and is associated with a service causing the at least one asset movement between the accounts; for a first event message of the stream of event messages: determining, by the assets interface, whether the first event message includes incomplete information; in response to a determination that the first event message includes incomplete information: registering, by a hydration system of the distributed assets management platform, at least one data field of the incomplete information associated with the first event message, and storing the first event message; updating, by the hydration system, a the at least one data field with updated information to transform the first event message into a completed event message; generating, by the assets interface, a liquidity event message based on the completed event message for a periodic movement of assets between the accounts of the commerce platform based on one or more conditions associated with balances of the accounts of the commerce platform, the assets interface further transmitting the liquidity event message to a liquidity engine of the distributed assets management platform; and executing, by the liquidity engine, in response to receipt of the liquidity event message, the periodic movement of assets between the accounts of the commerce platform.

An exemplary system includes a non-transitory memory storing instructions; and a processing system coupled with the memory and configured to execute the instructions causing the system to perform operations, the operations comprising: receiving, by an assets interface of a distributed assets management platform, an event message associated with an operation requesting an asset movement between accounts of a commerce platform, the event message having a plurality of data fields corresponding to the asset movement and a first identifier; accessing, by the assets interface, a configuration for the asset movement based on account identifiers for the accounts as defined in the plurality of data fields, the configuration defining one or more legs for execution of the asset movement; transforming, by the assets interface, the event message to one or more asset movements corresponding to the one or more legs defined in the configuration; generating, by the assets interface, one or more corresponding sub movement event messages for the one or more legs; and transmitting, by the assets interface, at least one of the one or more corresponding sub movement event messages to a liquidity engine causing one or more asset movements between the accounts of the commerce platform.

An exemplary system includes a non-transitory memory storing instructions; and a processing system coupled with the memory and configured to execute the instructions causing the system to perform operations, the operations comprising: receiving, by a hydration system from an assets interface, a registration request associated with an event message, the event message identified by a first identifier and including a placeholder value for a data field of the event message that is unknown at a time the event message is generated; receiving, from a first hydration data source, a candidate identifier and a set of data corresponding to the candidate identifier; determining that the first identifier matches the candidate identifier; and in response to determining that the first identifier matches the candidate identifier, updating, by the hydration system, the data field with a first data value of the set of data.

An exemplary system includes a non-transitory memory storing instructions; and a processing system coupled with the memory and configured to execute the instructions causing the system to perform operations, the operations comprising: receiving, by an application programming interface (API) endpoint of an exchange platform, an API event message that defines a first amount of a first type of asset and a second amount of a second type of asset; processing, by an aggregator of the exchange platform, the API event message to accumulate a total amount of the first type of asset and a total amount of the second type of asset in response to receipt of the API event message; detecting, by an exchange manager of the exchange platform, when at least one of the total amount of the first type of asset and the total amount of the second type of asset satisfies a condition defining when a second amount of the first type of asset is to be converted to the second type of asset; and in response to detecting satisfaction of the condition, initiating a process by which a remote system converts the second amount of the first type of asset to the second type of asset.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
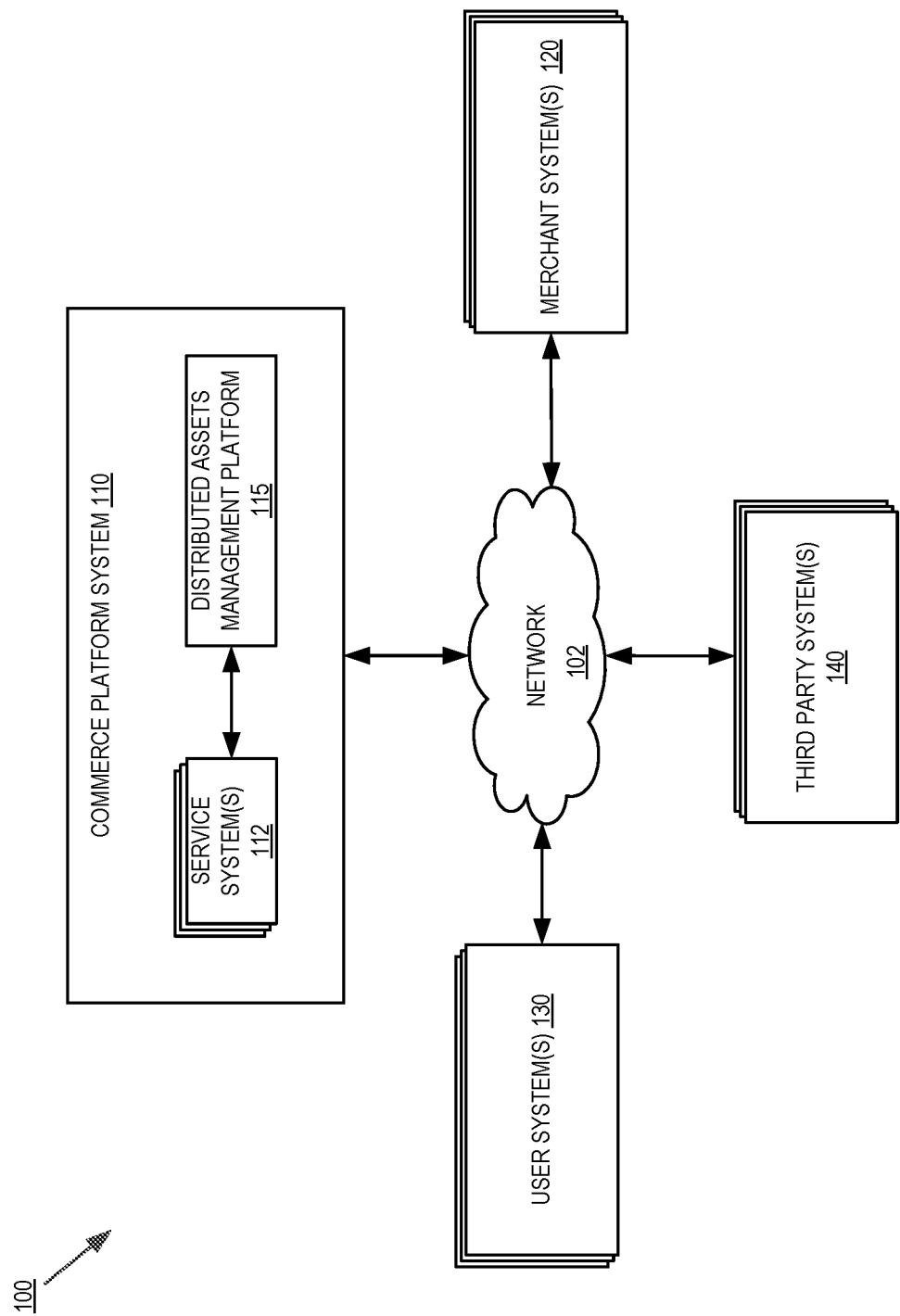
FIG. 1 is a block diagram of an exemplary system architecture of a commerce platform that performs asset management for distributed services.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "accessing", "processing", "detecting", "determining", "generating", "transmitting", "identifying", "updating", "splitting", "initiating", "executing", "transforming", "storing", "updating", "aggregating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Distributed Assets Management Platform Architecture

FIG. 1 is a block diagram of an exemplary system architecture of a commerce platform that performs asset management for distributed services. In one embodiment, the system 100 includes commerce platform 110, one or more merchant system(s) 120, one or more user system(s) 130, and one or more third party system(s) 140 (e.g., regulatory systems, banking systems, card network systems, authentication systems, foreign exchange trading systems, etc.). In one embodiment, one or more systems (e.g., system 120, 130, and 140) may be computer systems, such as a desktop computer system, laptop computer system, server computer systems, etc. The commerce platform 110, merchant system(s) 120, and third party system(s) 140 may also be one or more computing devices, such as one or more server computer systems, desktop computer systems, etc.

The embodiments discussed herein may be utilized by a plurality of different types of systems, such as other commerce platform(s) including payment processing systems, card authorization systems, banks, and other systems seeking to manage asset movements using a distributed and extensible computing architecture, as discussed herein. Furthermore, any system seeking to manage asset movements may utilize the techniques discussed herein. However, to avoid obscuring the embodiments discussed herein, the management of asset movements is discussed in terms of an example commerce platform to illustrate and describe the embodiments of the present invention, and is not intended to limit the application of the techniques described herein to other systems.

The commerce platform 110, merchant system(s) 120, user system(s) 130, and third party system(s) 140 may be coupled to a network 102 and communicate with one another using any of the standard protocols for the exchange of information, including secure communication protocols. In one embodiment, one or more of the commerce platform 110, merchant system(s) 120, user system(s) 130, and third party system(s) 140 may run on one Local Area Network (LAN) and may be incorporated into the same physical or logical system, or different physical or logical systems. Alternatively, the commerce platform 110, merchant system(s) 120, user system(s) 130, and third party system(s) 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including hosted configurations, distributed configurations, centralized configurations, etc.

In one embodiment, commerce platform 110 provides financial processing services to one or more merchants, such as to merchant system(s) 120 and/or user system(s) 130. In some examples, commerce platform 110 may manage merchant accounts held at the commerce platform, run financial transactions from user system 130 performed on behalf of a merchant system, clear transactions with third party systems 140 (e.g., credit card systems, banking systems, payment service systems, etc.), perform payouts to merchant and/or merchant agents, manage merchant and/or agent accounts held at the commerce platform 110, manage transfers between accounts established for different merchant system 120, perform tax tracking and regulatory compliance services for one or more of the merchant system 120, one or more user system(s) 130, and/or one or more service system(s) 112 as well as other services typically associated with commerce platforms systems.

In embodiments, commerce platform 110 therefore includes a plurality of service system(s) 112 that independently and collaboratively provide the various services of the commerce platform discussed herein to merchant system(s) 120, user system(s) 130, and third party system(s) 140, as well as to other service system(s) 112. That is, each service system 112 may not only support the services offered to external systems (e.g., user system(s) 130, merchant system(s) 120, and/or third party system(s) 140), but may also aid and contribute to the execution of other service system(s) 112. Each of the service system(s) 112 is a distributed service system, such that one or more instances of each service system may be executed by distributed computing resources of the commerce platform 110. In some examples, the service systems are systems that execute payment processing services, subscription services, digital wallet services, regulatory compliance services, fraud detection services, as well as other services associated with commerce platforms, such as commerce platform 110.

In embodiments, each of the service system(s) 110 in executing their respective services therefore generates what is collectively referred to herein as event messages communicated from a service system to distributed assets management platform 115. An event message, as discussed in greater detail herein is an electronic message that defines various asset movement implications, such as a nature of a transaction sought to be processed by a service system, one or more event message identifiers that will identify one or more asset movements associated with the event, account identification information (e.g., source and destination accounts of asset movement that will be caused by the event), asset movement implication information (e.g., data describing account credits, account debits, as well as other information including currencies involved), timing information (e.g., information describing when assets should move between accounts), as well as other information. The plurality of service system(s) 112 that continuously process transactions for the commerce platform 110 therefore generate a stream of event messages sent to the distributed assets management platform 115.

Distributed assets management platform 115 is responsible for performing real time asset management for the events generated by the service system(s) 112. That is, each of the service system(s) 112 perform their respective operations generating a stream of independent events having different asset movement implications for the various accounts maintained by the commerce platform 110. Then, distributed assets management platform 115, as discussed in greater detail below, includes distributed systems and platforms that collectively manage in house assets of the commerce platform 110. As discussed herein, the commerce platform 110 has a number of accounts (e.g., on the order of hundreds or more) that are geographically distributed around the world and/or associated with different entities of the commerce platform 110, the events generated the service systems 112 cause each of those accounts to have inflows (payments in from other accounts of the commerce platform, as well as payment in from external systems such as banking systems, credit card systems, digital wallet systems, etc.) and outflows (payments out to other commerce platform accounts, as well as payments to external systems such as banking systems, credit card systems, digital wallet systems, etc.), and potentially involving different currencies between source and destination accounts. In embodiments, an entity is a division of the commerce platform 110, such as a juristic entity, a geographic entity, a legal entity, a service system based entity, etc.

Ultimately then, there are times when an asset is to move between accounts to ensure, in some examples, there are sufficient asset totals to support an asset movement (e.g., an account has a sufficient balance to support an outflow, a potential currency volume will support transaction loads, etc.). In other words, and as discussed in greater detail herein, distributed assets management platform 115 is responsible for ensuring account liquidity so that assets are where they needs to be at the correct time to support the service system(s) 112 (e.g., a service system does not debit an account with a negative balance or insufficient asset totals), and also to minimize and manage exchange exposure (e.g., ensuring a US based entity does not have an unacceptable level of Euros in its accounts). Therefore, in some examples, distributed assets management platform 115 processes service system events (e.g., a charge happened, a refund happened, a dispute happened, etc.) as a stream of event messages, converts each event message to an assets management platform message indicative of an asset movement impact (e.g., inflows, outflows, accounts, timing, foreign exchange implications, etc.), and then manages the asset movement impact within accounts of the commerce platform 110 in response to the events. The management of assets by the distributed assets management platform 115 involves, in some examples, generating asset movement operations that move assets between accounts to ensure the multitude of commerce platform 110 accounts have sufficient assets when they need it.

Furthermore, given the fluctuating nature of system load on asset movements (e.g., increased event messaging related to transactions as a result of holidays in specific geographic regions, increase in merchant traffic, regular cyclic activity such as increase transaction load during weekends, etc.), distributed assets management platform 115 utilizes a distributed architecture of communicatively coupled systems and platforms that flexibly and with independence collectively perform asset movement operations and exchanges to ensure each account and thus service system has sufficient assets at the correct time. Furthermore, the distributed nature of the architecture of the distributed assets management platform 115 enables system and/or platform reuse, such as dynamic instance generation and taking down to dynamically respond to system load placed on the service system(s) 112, and thus the distributed assets management platform 115, of the commerce platform 110.

Figure 2:
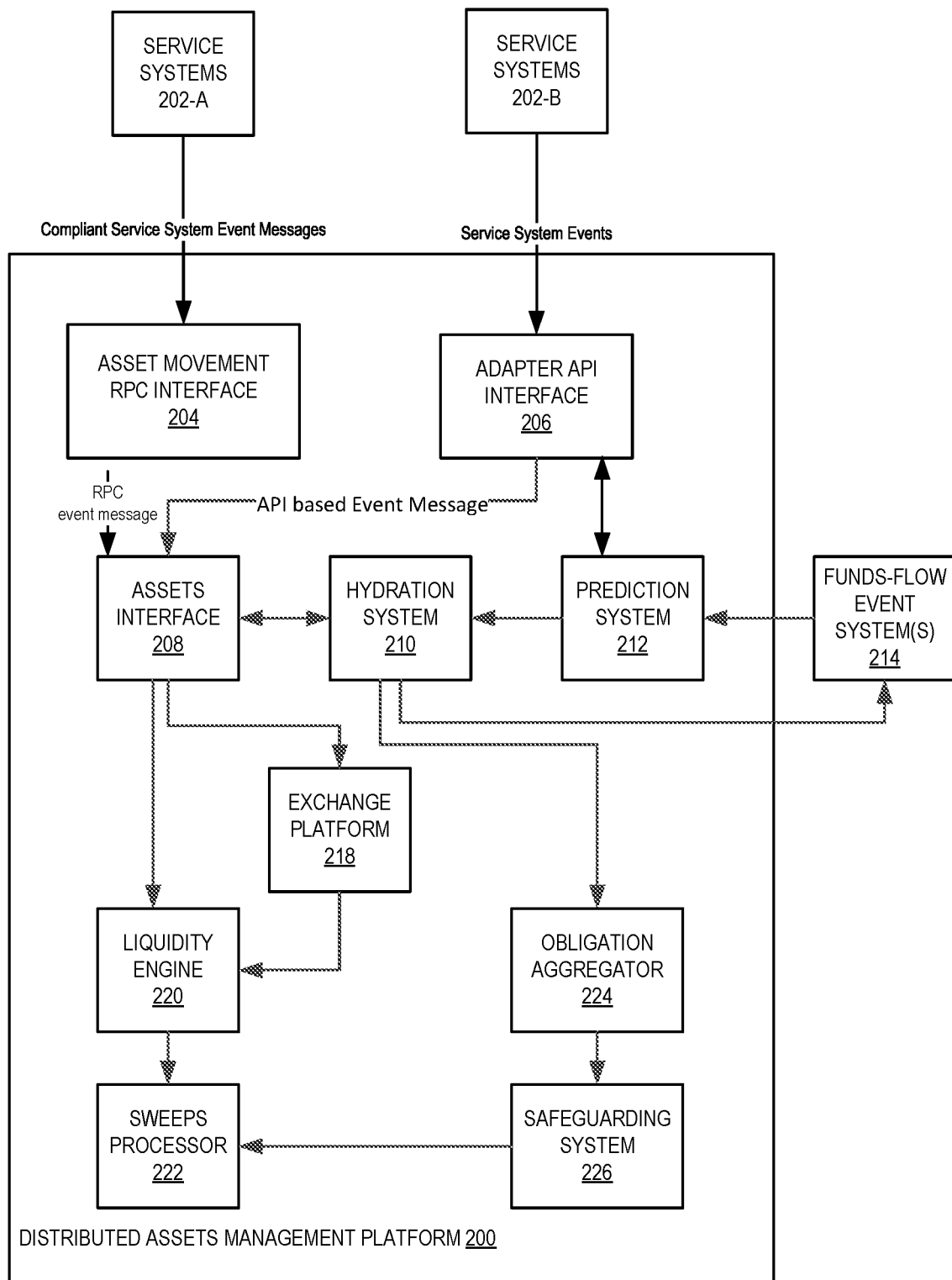
FIG. 2 illustrates a block diagram of one embodiment of a distributed assets management platform for performing asset management for a commerce platform.

FIG. 2 illustrates a block diagram of one embodiment of a distributed assets management platform 200 for performing asset management for a commerce platform. The distributed assets management platform 200 provides additional details for the distributed assets management platform 115 discussed above in FIG. 1.

The distributed assets management platform 200 includes a plurality of systems and platforms, the operations of which are discussed in greater detail below. Each of the plurality of systems and platforms are executable on distributed processing resources of a commerce platform, and represent instances of each such system and/or platform. Thus, in some examples, one or more of the plurality of systems and platforms may spawn new instance(s) to account for increased system load and/or take down instance(s) in response to decreased system load. Therefore, the operations discussed below are those of a given instance of the corresponding systems and platforms.

Furthermore, as discussed above, distributed assets management platform 200 is responsible for managing the asset movement implications generated by the service system(s) 202-A and 202-B. The service system(s) 202-A and 202-B are those illustrated and described above in FIG. 1 (e.g., service system(s) 112), and generate various event messages in response to product and/or transaction operations generated by the service system(s) 202-A and 202-B, which may be referred to as product level events or service system events.

The service system 202-A is a service system that is integrated with distributed assets management platform 200, as indicated by the stream of compliant service system event messaging sent to cash flow remote procedure call (RPC) interface 204. As will be discussed below, with respect to FIGS. 4 and 5, the assets interface 208 defines a standard format for distributed assets management platform 200 event messaging which includes all relevant fields of information sufficient to invoke a workflow to manage a movement of assets. Thus, the service system 202-A is a service system capable of generating event messages that comply with the format structure and content definitions of the assets interface 208. Thus compliant service system event messages may be streamed as remote procedure call (RPC) event messages via an application programming interface endpoint, such as the cash flow RPC interface 204. RPC interface 204 is a network addressable location where the service system 202-A can address event messages for entry into the distributed assets management platform 200, and serves to forward event messages to the assets interface 208. The content and formatting, as discussed in greater detail herein includes an event identifier (e.g., a unique identifier generated for each event by a service system generating the event), source and destination account identifiers, timing information (e.g., timestamps indicating when assets can depart a source and when assets should be available at a destination), and an amount associated with the event (e.g., a debit amount from a source account specifying a currency, and a credit amount at the destination account specifying the same or different currency). The cash flow RPC interface 204 then transmits an API based remote procedure call to an API messaging endpoint exposed by the assets interface 208 to validate the product event message and insert the message into the asset management processes of the distributed assets management platform 200.

In some embodiments, distributed assets management platform 200 may work with alternative service systems such as the service system 202-B that are not integrated with distributed assets management platform 200. In this alternative setup, the stream of event messages sent from second service system 202-B is sent to the adapter API interface 206. The second stream of event messaging includes event messages that include incomplete data and/or incorrect formatting. The adapter API interface 206, similar to RPC interface 204, is also a network addressable location, but is configured to receive a second stream of event messages from the non-integrated service system 202-B, so that the adapter API interface 206 can transform each of the second stream of event messages into compliant event messages. In some embodiments, the second event messages include an event identifier (e.g., generated by a service system to uniquely identify the event), but does not specify source and/or destination accounts for an asset movement, as is specified in the compliance event messages. Thus, in some examples, the adapter API interface 206 uses the event identifier to perform one or more lookups with the service system that generated the event message, other service system(s) that process portions of a transaction related to the event, a database of accounts associated with service systems or entities for which the service system is performing operations, etc. to determine the source and destination account information for an event message, as well as timing information specifying funds availability. In some examples, the event identifier may be used to query service system(s) (e.g., charge service systems, accounting service systems, credit card processing service system(s), etc.) to determine which accounts are relevant to an event/transaction, and in some examples timing constraints imposed on the event/transaction by such service system(s). In response to obtaining sufficient data to generate a compliant event message, the adapter API interface 206 generates an API message having the requisite information, identifiers, and timing information, and transmits the API message to the API endpoint exposed by the assets interface 208. In some examples, the API messages generated by API interface 206 are compliant messages as a result of the adapter API interface 206 updating the message to include the requisite information, identifiers, and timing information expected by assets interface 208. The API based messages are used for validation of event messages and insertion of the event messages into the asset management processes of the distributed assets management platform 200.

the assets interface 208 is responsible for receiving the streams of API based RPC event messages and API messages from the cash flow RPC interface 204 and the adapter API interface 206. These event messages are collectively referred to herein as asset interface event messages, and in some examples event messages. In response to receipt of each event message, the assets interface 208 first verifies whether an event message is permissible or able to be processed. That is, an event message may specify events associated with sanctioned countries, violate regulatory compliance requirements, exceed commerce platform controls, etc. Thus, the assets interface 208 may reject an event message when the data defined in the event message violates any of the feasibility or permissibility constraints on allowable asset movement events. When rejected, a notification is generated and transmitted to the originating service system and/or other service systems as to the event/transaction that violated one or more feasibility checks. However, when determined to be permissible, the assets interface 208 generates a signature (e.g., a hash or other cryptographic identifier form the content of the event message, such as a concatenation of various fields) so that the signature can be later regenerated to determine that no information (e.g., original source and destination accounts, amounts, timing information, etc.) has been changed. Event message permissibility or feasibility analysis is discussed in greater detail below.

In some examples, not all information in the event message is known at the time of the event message is created (e.g., timing information including when a transaction clears, when assets should be available, actual amount that clear, revision of an estimate, etc.), and placeholder values may be used to temporarily fill in the information. In some examples, the assets interface 208 registers, for each event message that has one or more placeholder values, the placeholder value for the event message (e.g., based on the event message ID) with hydration system 210. In some examples, the event messages may be queued at the assets interface 208 while the missing data field(s) of event messages are obtained and/or determined by the hydration system 210.

Hydration system 210 maintains a cache or other storage of event identifiers (e.g., globally unique identifiers generated by respective service systems) and information fields which are needed (e.g., those fields for which a placeholder is being used). In some examples, as will be discussed below, hydration system 210 hydrates, or obtains and adds the missing data fields to event messages that are queued in the assets interface 208. The hydration of the missing information occurs in a number of ways. In some examples, hydration system 210 may listen to or observe data communicated over a communications channel, bus, etc., generated in various event streams of the funds-flow event system(s) 214 to determine if any events with the missing information (e.g., identified by the globally unique event identifier) are detected. In some examples, hydration system 210 may query specific funds-flow event system(s) 214 directly for missing information. In some examples, the prediction system 212 may be used to anticipate and predict the missing information. In some examples, the prediction system 212 is a machine learning based the prediction system (e.g., a neural network, generative system, tree based model, models with seasonality, etc.) pretrained and periodically retrained, based on a data set including data representing events specifying a timing of event creation, account identifiers, service system identifiers, and missing information fields, to predict the missing information based on actual settlement information indicating when assets actually moved between accounts). Thus, the prediction system 212 is able to accurately predict or estimate missing information in event messages as the training data used to train the prediction model(s) is based on actual real world settlement information, retraining can be performed to adapt to real world events and trends. In some examples, prediction system 212 generates predictions using data obtained from the messages received from the adapter API interface 206, which can supply data inputs to the machine learning based prediction system. In some examples, hydration system 210 may utilize default values predetermined for missing fields (e.g., an assets available at time default value set by a human operator, selected based on a number of standard deviations from a mean timing information, etc.). Any of these approaches will hydrate, or complete, the missing information of an event message.

In some examples, the prediction system 212 is used to provide information about settlement information. The prediction system 212 may provide highly accurate predicted settlement delays to downstream services, when there is incomplete information to process the transaction. The downstream services may utilize the predicted settlement delays in one or more operations which may be unimpacted when the corresponding settlement reports are received, i.e., given that the settlement delays indicated in the settlement reports will be substantially the same as the predicted settlement delays. In this manner, the subject system reduces the processing, memory, and/or communication resources utilized by the downstream services by reducing or eliminating the need for any additional, e.g., corrective, transactions and/or operations when the settlement reports are received. Thus, the prediction system 212 may be utilized to provide estimates of information to hydration system 210, such as predicted settlement timing information including delays, that would otherwise be incomplete. In some examples, the predictions generated by the prediction system 212 are provided as updates to the hydration system 210, enabling the hydration system 210 to update (e.g., hydrate) previously incomplete information. Furthermore, in some examples, the predictions generated by prediction system 212 are generated periodically or continuously so that prediction system 212 can periodically or continuously supply updates to the hydration system 210.

In some examples, hydrated event messages may further be sent from hydration system 210 to the obligation aggregator 224. The obligation aggregator 224 is responsible for periodically aggregating obligations using the hydrated event messages, such as completed credit and debit amounts, completed transfer and/or settlement times, etc., associated with accounts of the commerce platform. In some examples, the obligation aggregator 308 takes detailed transaction-level asset movements, which can be voluminous and complex, and transforms the movements into aggregated data sets based on certain criteria such as transaction type (e.g., e-money or money), currency, jurisdiction, and/or other relevant dimensions. This process may involve grouping individual records that share common attributes and computing summary statistics like total amounts of assets, averages of assets in accounts, or counts. The obligations aggregator 308 may reduce the complexity and volume of data related to asset movements, making the data more manageable and easier to process by downstream services, such as the safeguarding system 226. The aggregated results are then provided from the obligation aggregator 224 to the safeguarding system 226.

In some examples, the obligation aggregator provides transaction-level asset movements to the safeguarding system 226, which uses the received aggregated obligations to meet safeguarding constraints. Safeguarding constraints include conditions that require businesses to protect customer assets, ensuring that assets are available and correctly allocated, such as ensuring sufficient balances that avoid overfunding and underfunding accounts, preventing commingling of assets, satisfying regulations associated with asset distribution and/or balances for different jurisdictions in which the commerce platform holds accounts.

The safeguarding system 226 helps to ensure that safeguarding obligations are met. In some examples, safeguarding obligations require that the funds are available to customers, financial institutions, etc., and are correctly allocated. Accurately predicting settlement delays helps a financial institution know when funds from card transactions will be available in its accounts. For instance, a financial institution needs to maintain a certain level of liquidity to meet its immediate obligations, including customer withdrawals or refunds. In some examples, the safeguarding system 226 may receive updates from the prediction system 212. The safeguarding system 226 may utilize predictive models to satisfy liquidity requirements, which provide a reliable forecast of cash inflows from settlements. In some examples, the safeguarding system 226 may utilize predictions provided by the prediction system 212. Estimates may be based on machine learning (ML) predictions and/or heuristics and serve as a stopgap, allowing the financial service provider to make informed estimations of the missing data based on historical trends, patterns, and/or known variables. For example, ML models can predict the likely settlement amount based on similar past transactions or estimate the settlement time by analyzing the typical duration for transactions of a similar nature. In situations where customer funds are to be held in segregated accounts, knowing the settlement times helps verify that these accounts are adequately funded in compliance with regulatory requirements. With the estimated data, the safeguarding obligation or constraints can be estimated and met within the respective time constraint.

In some examples, each of the hydration or prediction approaches noted above and discussed in greater detail below, may form a hierarchical set of hydration options such that information is selected for hydration purposes according to its hierarchical level (e.g., such as preferences in the order of an observed/reported value, a machine learning model generated value, and a default value). Furthermore, hydration system 210 may continue to listen and/or attempt to obtain missing information (e.g., periodically or continuously) for a predetermined time period, such as receiving predictions from prediction system 210, so that corrections may be issued when new/different data is detected from a more trusted hydration method according to a hierarchy of hydration methods.

Furthermore, in some examples, the assets interface 208 may modify certain event information, such as splitting an asset movement (e.g., a primary asset movement specified in an event message, a fee amount, a credit card agency fee amount, etc.) into a plurality of constituent or related asset movements. Furthermore, an asset movement may be altered to resolve a non-feasibility or impermissible detection when an impermissible asset movement is transformed into a permissible asset movement when an original route for the movement is split into multiple asset movement routes. Such leg splitting enables the assets interface 208 to improve and increase event messaging throughput and processing by enabling asset implication management for otherwise impermissible events. In some examples, feasibility analysis performed by the assets interface 208 can detect that an asset movement from acct_A to acct_B is impermissible (e.g., because such a movement would violate commerce platform policy, a regulation, involves a transfer between incompatible accounts, etc.). However, acct_A can be determined as permissible to move assets to acct_X, and acct_X can be determined as permissible to move assets to acct_B. Thus, the event message may be altered by the assets interface 208 so that the event message includes more internal movement legs to enable an assets movement and/or is split into a set of asset movement events. Note that feasibility may not be the only condition that is used for adding/modifying asset movement legs of an asset movement. In some examples, preferred movements to and/or through predetermined accounts, tax benefit based movements that will minimize tax implications of associated accounts, preferred account status, etc. may inform and/or enable alteration of an initial asset movement to two or more asset movements.

The event message, with the identifier is then forwarded to liquidity engine 220 and optionally exchange platform 218. In some examples, the original event message may be forwarded, or a new event message generated, in some examples one that complies with an API formatting requirement of API endpoints of the liquidity engine 220 and/or exchange platform 218. The liquidity engine 220 is responsible for collecting, scheduling, and initiating money movements with the sweeps processor 222, to maintain a certain level of liquidity of assets of the commerce platform in the various accounts to meet immediate and future obligations, such as ensuring sufficient assets in accounts at the appropriate times for withdrawals, refunds, top-ups, scheduled transfers, etc.

In some examples, the liquidity engine 220 collects asset movements (e.g., from the event messages of the assets interface 208) and schedules transfers, confirms compliance with regulations related to assets transfers, as well as other liquidity related functions. In some examples, the liquidity engine 220 represents asset movements as targets and balances, rather than credits and debits. In some examples, a target is a desired liquidity of an account and balances represent a current account balance. The targets may be adjusted by the liquidity engine 220 to match accounts of the commerce platform. Then, sweeps are planned and executed by the sweeps processor 222 based on the adjusted targets and balances, and further in view of the input of the safeguarding system 226, to perform asset movements to manage account liquidity. Furthermore, the asset movements caused by liquidity engine 220 can include detecting float usage by upstream services. Float usage is a scenario where assets exist simultaneously in two accounts at the same time when debit moves assets from an account, and the increased liquidity may cause float based on timing of the asset movements. In some examples, the liquidity engine 220 detects float, and attributes the float to upstream services causing the float. Float detection can be communicated to the service causing float in the event float is not intended. Then, the sweeps processor 222, which in some examples is integrated into the liquidity engine 220, collects the reported event messages and executes money movements (e.g., physically moves assets between accounts) at periodic intervals (e.g., every minute, hour, day, etc.) to ensure sufficient liquidity within the accounts of the commerce platform 110.

In some examples, each event message has asset movement implications as each message specifies source and destination accounts, settlement times when assets should be available in an account and taken from an account, and currencies of the asset movements. When there is difference in currency in any two accounts of an asset moment (e.g., original accounts or added legs/accounts of an asset movement, credit and debit amounts are denominated in different currencies, etc.), then an exchange exposure is encountered, such as foreign currency exchange exposure. The exchange exposure is a detection that a foreign currency exchange is implicated to accept a payment for a service in US dollars and payout a merchant in Euros. Exchange platform 218, as discussed below, is responsible for collecting the exchange exposures incurred by each entity of the commerce platform (e.g., the owners of accounts), and automatically initiating asset exchanges to mitigate aggregated exposures/risk per entity. As will be discussed in greater detail below, the asset exchanges performed by exchange platform 218 may be automatically initiated based on thresholds (e.g., trade USD to Euros when USD reaches $1 million dollars for an entity that prefers Euros), differences in account values (e.g., USD should not exceed twice Euros for entity), as well as other asset exchange exposure conditions.

In some examples, the exchange exposure being aggregated and ultimately currency trades performed are communicated to the liquidity engine 220 to enable liquidity engine to account for current levels of exchange exposure, account for balance changes in response to currency trades, etc. when determining when to initiate sweeps with the sweeps processor 222.

Figure 3A:
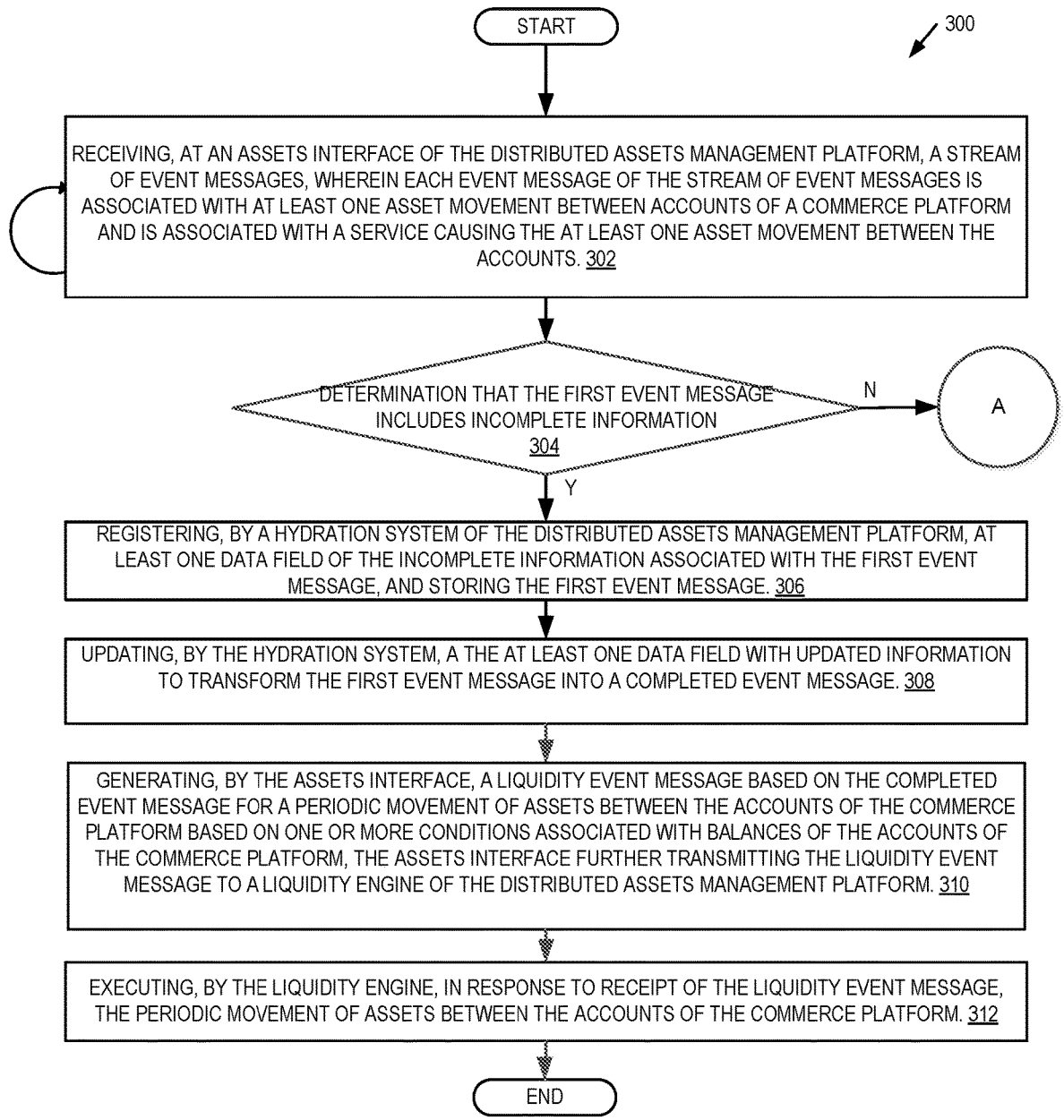
FIGS. 3A-B illustrate a flow diagram of one embodiment of a method for performing asset management by a distributed assets management platform.
Figure 3B:
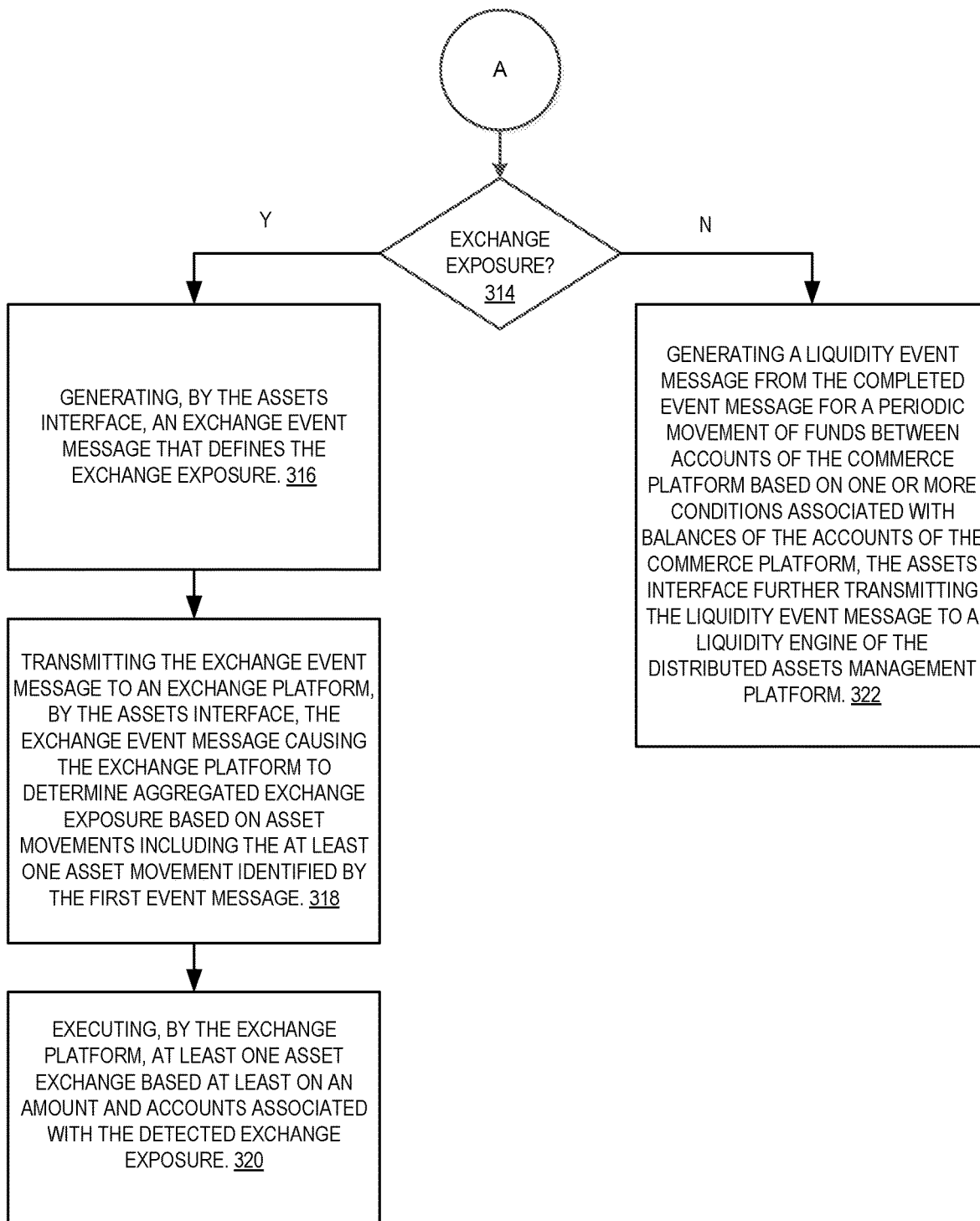

FIGS. 3A-3B illustrate a flow diagram of one example of a method for performing asset management by a distributed assets management platform. The method 300 is performed by processing logic that may comprise hardware (circuitry, dedicated logic, etc.), software (such as is run on a general-purpose computer system or a dedicated machine), firmware, or a combination. In one example, the method 300 performed by the distributed assets management platform is performed by an asset management platform, such as distributed assets management platform (e.g., platform 115 or 200).

Figure 6:
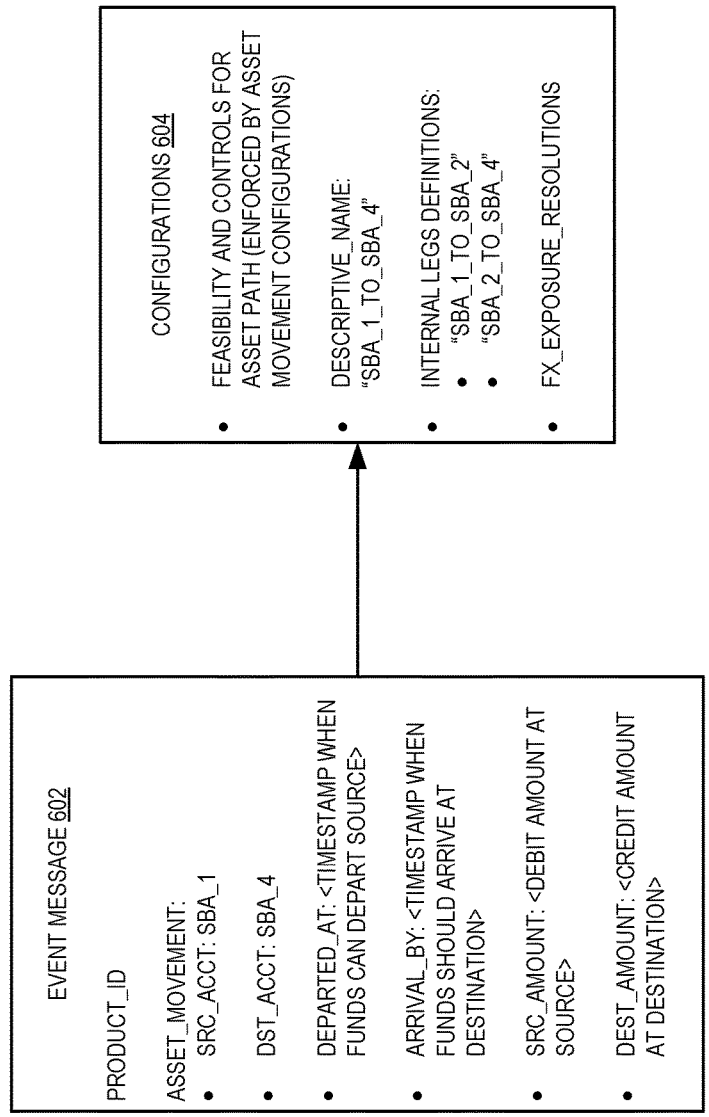
FIG. 6 is a block diagram of an event message and accessed configurations.

Referring to FIG. 3A, processing logic begins by receiving, at an assets interface of the distributed assets management platform, a stream of event messages, wherein each event message of the stream of event messages is associated with at least one asset movement between accounts of a commerce platform and is associated with a service causing the at least one asset movement between the accounts (processing block 302). In some examples, the event messages are product level event messages generated by the service system(s) of a commerce platform, and the platform interface is an event messaging interface for receiving and processing the event messages, as discussed herein. In some examples, a subscription service, a charging service, a tax accounting service, etc. may each generate event messages that implicate asset movements associated with the respective services. One example of information included in such a message standardized for use across service systems is illustrated in FIG. 6. By having an interface and a standardized message format, any service system may report event messages with asset movement implications to enable the distributed asset management platform to handle, respond, and execute asset movements to ensure sufficient liquidity across accounts and to ensure exchange exposure is within configurable tolerances. Thus, the asset management processes discussed herein are extensible to the various service systems, as well as to new service systems, that report asset movement events via the standardized messaging.

For a first event message of the stream of event messages, processing logic determines whether the first event message includes incomplete (processing block 304). Completeness is a status of a message with sufficient information to manage an asset movement associated with a product level event. In some examples, an event message is complete when it includes data that defines source and destination bank accounts associated with the asset movement, as well as an overall transfer amount to and from the accounts, such as an event message defining asset movement from SBA_1 to SBA_4 where $X (USD) is debited from SBA_1 and $7 (EURO) is credited to SBA_4. In some examples, timing information including when the asset should leave a source account and be available at a destination account may also be used to ensure message completeness. However, timing information is not required in some examples for message completeness, as discussed below. In such an example, message completeness is determined earlier to enable faster and more efficient intake of events into a distributed asset management platform, and thus sooner and more efficient processing of underlying asset movements.

When it is determined that a message is not complete at processing block 304, the hydration system of the distributed assets management platform registers at least one data field of the incomplete information associated with the first event message, and storing the first event message (processing block 306). In some examples, not all information may be known at the time of the event message, but this does not render the message incomplete. Rather, information such as timing of transfers may be set with placeholder values, which is supplied at a later time through a data hydration process performed by the hydration system as discussed herein. Then, the registration of each incomplete flow event message, by the unique product level identifier and/or other identifier, of the event message enables the missing data to be obtained and added to the flow event message data to complete the data therein. Beneficially, even with incomplete information however, an event message is processed by processing logic to place the event information into the distributed asset management platform early to provide a more accurate and timely accounting of the asset movements reported via the messaging.

The hydration system then updates the least one data field with updated information to transform the first event message into a completed event message (processing block 308). In some examples, product event messages are transmitted across a messaging bus of the commerce platform to report charges, record events in data stores, etc. The messaging bus may be a communications channel or messaging interface, in some examples. These messages each identify the underlying transaction that they apply to via the globally unique identifier generated during the underlying transaction by a service system. In some examples, processing logic of the hydration system therefore listens or observes the messaging flowing across the event bus for messages having the globally unique IDs as registered with the hydration system to detect and therefore obtain missing information, queries data streams for messages, receives event reporting that may include missing data fields, etc. In some examples, a message may not have data representing availability at a destination account. When a charge clears and this information is transmitted across the commerce platform's messaging bus, stored in a database, reported to the hydration system, etc., then the hydration system can obtain and/or extract this information for hydration of the event message identified in processing block 304. Processing logic therefore updates the at least one data field with updated information to transform the first event message into a completed event message (processing block 308).

As depicted in FIG. 3B, when it is determined that a message is complete at processing block 304, optionally, for complete messages, an exchange exposure can be detected (processing block 314). In some examples, an exchange exposure is a foreign exchange (FX) exposure that is detected when a source and destination of an asset movement are identified with different currencies and/or credit and debit amounts are denominated in different currencies. That is, at some point during the asset movement identified in the event message, an exchange of currencies will have to be performed to accommodate the movement. Processing logic, in response to detecting an exchange exposure, generates (e.g., by the assets interface), an exchange event message that defines the exchange exposure (processing block 316), and then transmits the exchange event message to an exchange platform, by the assets interface, the exchange event message causing the exchange platform to determine aggregated exchange exposure based on asset movements including the at least one asset movement identified by the first event message (processing block 318). Optionally, the exchange platform may execute at least one asset exchange based at least on an amount and accounts associated with the detected exchange exposure (processing block 320).

In some examples, the aggregation of exposures across entities of the commerce platform, and subsequent execution of exchanges, is discussed in greater detail below. The aggregation and trades, however, enable the distributed asset management platform to ensure that regardless of source of an asset movement (e.g., asset movements originating from any service system), exchange exposure can be accurately and timely accumulated, and processed to ensure exposure does not exceed set conditions associated with predetermined levels of risk. Such interoperability and compatibility between service systems and an exchange platform enable simplified messaging and therefore remedying of exchange exposure at scale in a commerce platform where each service of the commerce platform has an independent implementation.

In some examples, exchange exposure may be detected prior to completing data fields of an event message. That is, the currencies defined in the originally received event message with the source and destination accounts and asset movement amounts are sufficient to create an exchange exposure (e.g., a movement of a specified amount from accounts denominated in different currencies), where the exchange exposure exists regardless of the timing of various asset movements. Thus, in some examples, processing logic may proceed from block 302 to input exchange exposure into the exchange platform in less time thereby enabling the exchange platform to more efficiently manage exchange exposures, as discussed herein.

In some examples, the exchange information (e.g., exchange trade information) and aggregated exposures may be communicated to a liquidity engine via event messaging so that the liquidity engine may incorporate the exchange exposure to better manage liquidity in the accounts of the commerce platform, as discussed in greater detail herein.

When no exchange exposure is detected, or alternatively automatically after the data update, processing logic generates a liquidity event message from the completed event message for a periodic movement of funds between accounts of the commerce platform based on one or more conditions associated with balances of the accounts of the commerce platform, the assets interface further transmitting the liquidity event message to a liquidity engine of the distributed assets management platform (processing block 322).

Moreover, an asset interface may generate a liquidity event message based on the completed event message for a periodic movement of assets between the accounts of the commerce platform based on one or more conditions associated with balances of the accounts of the commerce platform, the assets interface further transmitting the liquidity event message to a liquidity engine of the distributed assets management platform (processing block 310). The liquidity event message may be a single liquidity event message, or a group of liquidity event messages split from a single asset movement, that indicates the full set of asset movement information (e.g., source and destination accounts, as well as timing information regarding when movements should be performed).

Processing logic of a liquidity engine may then execute, in response to receipt of the liquidity event message, the periodic movement of assets between the accounts of the commerce platform. (processing block 312). In some examples, the processing of the liquidity event messages enables the liquidity engine to ensure proper liquidity (e.g., amount and timing) for any number of accounts of the entities of the commerce platform. Furthermore, through the extensible and interoperable systems and platforms of the distributed assets management platform, liquidity can be ensured without additional programming complexity or operational efforts placed on the service systems. Thus, a more robust and accurate liquidity process is enabled through the distributed assets management platform, as discussed herein.

Assets Interface

Figure 4:
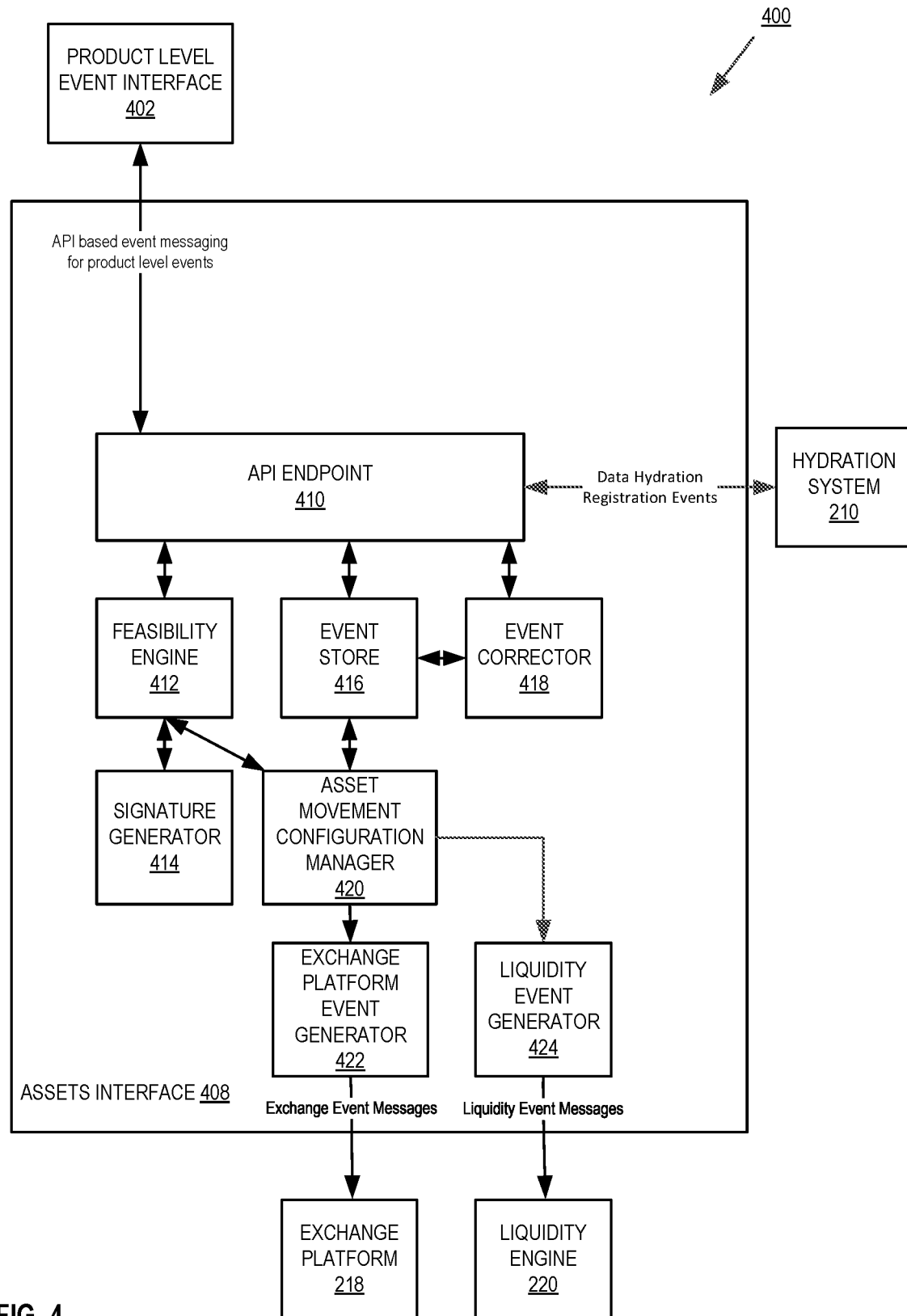
FIG. 4 is a block diagram of an assets interface of a distributed assets management platform.

FIG. 4 is a block diagram of an assets interface 408 of a distributed asset management platform. The assets interface 408 provides additional details for the assets interface 208 discussed above in FIG. 2.

In some examples, the assets interface 408 is an entry point into the distributed asset management platform, as discussed herein. At a high level, the assets interface 408 is responsible for taking in product level events for a variety of distributed service systems (e.g., service system(s) 112, 202-A, and/or 202-B), and converting them into event messages including liquidity event message(s) and/or foreign exchange (FX) event messages. This process and the operations performed in the execution of this process are discussed in greater detail below.

In some examples, the assets interface 408 includes an API endpoint 410 that exposes the assets interface 408 to various services (e.g., services distributed amongst various systems of a payment processing platform). In some examples, the API endpoint 410 exchanges API-based messages with the product level event interface 402. The product level event interface 402 collectively includes the RPC interface 204 and the adapter API interface 206 for purposes of discussion with respect to FIG. 4.

In some examples, API endpoint 410 is responsible for receiving API-based messaging (e.g., asset movement event messaging) from the product level event interface 402. The API-based event messaging initiates an operation, such as a requested movement of assets between accounts in response to a distributed service's operations having an implication (e.g., a service system generating a charge, a service system issuing a refund, a service system transferring balance between accounts, etc.). In some examples, a service that generates a charge during a transaction may report the charge as a message for the event of the charge.

FIG. 6 illustrates an assets interface event message 602 that is received and processed by API endpoint 410. The message 602 includes data fields including a product_ID that is a globally unique identifier given to the message and identifying the underlying transaction. This product_ID therefore can serve to accurately and globally identify the event message at any point in the distributed asset management process, such as operations performed by the assets interface 408, during hydration processing, during liquidity processing, and/or during exchange processing, as discussed herein. The event message 602 data fields further include source and destination account data fields, as well as debit and credit amounts to be applied to the accounts, where the accounts are illustrated as SBA_1 and SBA_4 in message 602. Additionally, the event message 602 includes data fields for a departed_at timestamp indicative of when assets can depart the source account, and an arrival_by timestamp indicative of when assets should arrive at (e.g., be available at the destination account). These timing parameters define a relationship between logical assets based accounting systems (not shown) and physical assets as moved by the distributed assets management platform 200. The event message 602 therefore defines the physical movement of assets and movement parameters for the movement of the assets. Furthermore, the message 602 defines a standardized format enabling any number of service systems to interact with the assets interface, and thus the distributed assets management platform, via compliance messaging.

Returning to FIG. 4, in response to receiving an initial feasibility message, the feasibility engine 412 determines whether the asset movement requested by the event message can occur. In some examples, an asset movement is permissible when there are no conditions that would cause the asset movement's rejection. In some examples, the feasibility engine 412 consults the configuration manager 420 that stores conditions that will allow or block asset movements, such as blocking conditions that block movements to sanctioned countries, block asset movements that violate regulatory rules, block asset movements set to reflect internal policies of a commerce platform, block asset movements between specified accounts, etc. The feasibility engine 412 therefore analyzes the data fields in the event message against the conditions of one or more configurations stored by the configuration manager 420 to determine whether any blocking conditions apply rendering the transaction not permissible.

The configuration manager 420 further stores legs and internal leg(s) (e.g., asset movement routes) between various source and destination accounts as configurations. In some examples, an initial asset movement requested in an event message 602, such as from SBA_1 to SBA_4 may not be permissible due to a blocking condition or a direct route between SBA_1 and SBA_4 being unavailable. Therefore, the configuration manager 420 stores data indicative of allowable legs or routes for asset movements. A configuration 604 is illustrated in FIG. 6. As illustrated, the configuration 604 includes feasibility and controls for an asset movement pathway, a name of the configuration, a definition of internal legs for an asset movement when an route is indirect, and exchange exposure resolutions if any (e.g., if one or more legs create an exchange exposure). This configuration 604 therefore indicates whether the requested asset movement from the event message 602 is permissible and what the route of the permissible asset movement will be, such as the original route from SBA_1 to SBA_4 or a plurality of legs as illustrated in configuration 604. In some examples, the feasibility or permissibility controls of the configuration 604 are encoded as generic controls applicable to a plurality use cases, which act on the data of the event message 602 to determine feasibility or permissibility. In some examples, a control may encode a rule that assets associated with a user may only be sent to or swept into predefined accounts that are denominated as those that can accept user assets. In some examples, a control may encode a restriction imposed on assets of a certain industry that cannot be combined with other accounts. These controls may be used and applied to any number of event messages.

When the feasibility engine 412 determines the requested asset movement is not permissible, an error message may be returned to the product level event interface via an API endpoint 410 to inform of the underlying product/service associated with the requested asset movement. However, when the asset movement is determined to be permissible, the feasibility engine 412 uses the signature generator 414 to generate a signature, such as a hash value or other cryptographic identifier, from the event message 602. In some examples, the field values may be concatenated and hashed to generate an identifier (e.g., a unique identifier) which can later be regenerated and/or used to determine whether any values of the original event message are changed. Beneficially, later asset movements using a product_ID of the current asset movement, either due to error and/or nefarious intent, can be identified and blocked. The feasibility response is returned to the product level event interface 402.

For permissible asset movements, the API endpoint 410 then receives an event message request, also using the formatting of the event message 602 discussed above. The event message, including the ID, the signature generated during feasibility determination, and the data fields are stored in the event store 416. The event store 416 is a storage for received asset movement event messages that will be converted to asset exchange event messages and liquidity event messages.

In some examples, the service causing the generation of an event message may not know all fields of the event message 602 at the time of the generation of the event message 602. In some examples, a timing constraint or even a source or destination account may not be known initially. In some examples, placeholder values (e.g., a predetermined value signaling the fact that the actual value is unknown) may be inserted into one or more data fields of the event message. The API endpoint 410 detects when an event message includes one or more placeholder values and registers the event message (using the globally unique product_ID) and the needed data fields with the hydration system 210. Hydration system 210, as discussed in greater detail herein, is a system that monitors commerce platform event messaging for various event messages that are identified with a registered product_ID to detect whether a registered data field is available in the monitored event messaging. When the needed data field(s) are detected, hydration system 210 returns the data to the API endpoint 410 which replaces the placeholder value(s) for the identified event message in the event store 416. In some examples, event messages are stored in an event store for a maximum predetermined period of time while seeking hydration of needed data fields.

In some embodiments, multiple versions or instances of a missing data field may be obtained by the hydration system 210 and communicated to the API endpoint 410 over the course of the maximum period of time. In some examples, certain sources used by the hydration system 210 may include estimation sources, machine learning models that generate predicted values, and product messaging streams in which actual data values are exchanged. In embodiments, the event corrector 418 determines whether a data field added to an event message should be corrected. To do this, the event corrector 418 maintains a hierarchical ranking of hydration data sources such that a hydration data source may be preferred or trusted over another hydration data source (e.g., actual values are preferred over machine learning model values which are preferred over estimated or default values). Therefore, the event corrector 418 may update data values of data fields in the event messages stored in the event store 416. Additionally, in the event an event message is forwarded to the generators 422 and 424 before a more preferred data field source provides an associated value, the event corrector 418 may generate a correction that will cause an event to be replaced with a new event having the preferred values. This corrected event is sent through the configuration manager 420 and the generators 422 and/or 424 as discussed herein. In some examples, the corrected exchange event messages sent from the exchange platform event generator 422 sent to the exchange platform 218. In some examples, the corrected liquidity event messages sent from the liquidity event generator 424 are sent to the liquidity engine 220.

In some embodiments, if fewer than all needed data fields are not obtained within a set amount of time, the event message may be rejected or processed with default values. Such defaults values may be predefined and stored as configurations in the configuration manager 420.

However, when an event message is fully hydrated (e.g., all data fields are either initially received or supplied by the hydration system 210 within the set time period), the configuration manager 420 splits the event message into zero or more sub event messages based on an associated configuration(s). The configurations include a plurality of statically defined configurations (e.g., specifying predetermined routes or legs for a transfer and how an asset should be routed). In some embodiments, multiple routes for the same asset movement may be defined such that the configuration manager 420 can select the best movement for a given asset (e.g., such as an asset movement that reduces taxes, minimizes fees, reduces or avoids taxes, etc.).

The event sub messages (e.g., split routes, breaking up amount transfers between accounts, etc.) are then forwarded to the exchange platform event generator 422 when there is an exchange exposure (e.g., a difference in currency between a source and destination account), and also to the liquidity event generator 424. Each generator 422 is responsible for transforming the event message 602 into an API message to be transmitted to, and consumed by, an exchange platform 218 and/or the liquidity engine 220, as discussed in greater detail below.

Figure 5:
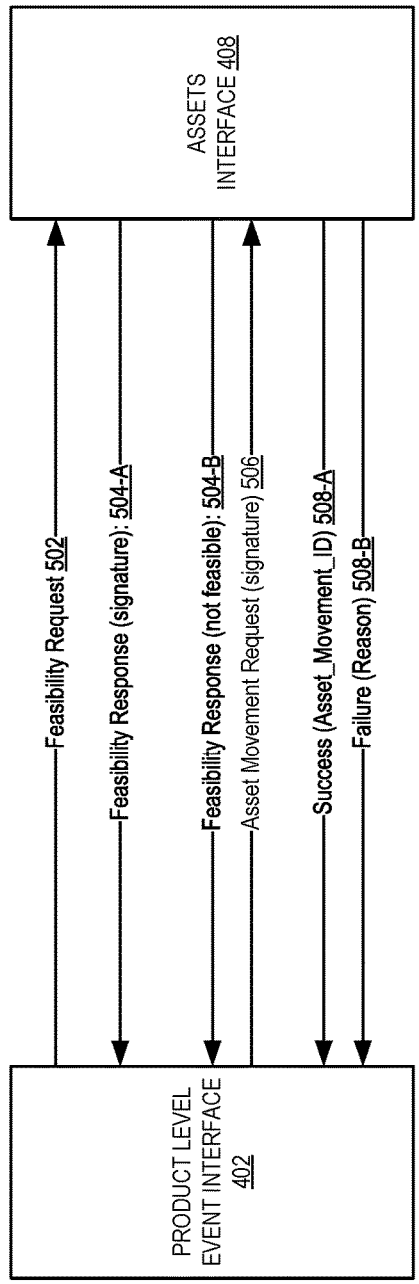
FIG. 5 is a diagram of one embodiment of a method for an application programming interface-based exchange of event messages between a product level event interface and an assets interface for intake of event messages into a distributed assets management platform.

FIG. 5 is a diagram of one embodiment of a method for an API-based exchange of event messages between a product level event interface and an assets interface for intake of event messages into a distributed assets management platform. The method is performed by processing logic that may comprise hardware (circuitry, dedicated logic, etc.), software (such as is run on a general purpose computer system or a dedicated machine), firmware, or a combination. In one embodiment, the method is performed by a product level event interface 402 and the assets interface 408.

The process begins with the product level event interface 402 generating a feasibility request 502 that is sent to the assets interface 408. The feasibility request 502 is an API-based message that includes data fields related to source and destination accounts, a product identifier, timestamps (if known), and transfer amounts. A feasibility of the asset movement is determined, as discussed above, and when permissible, feasibility response 504-A is sent back to the product level event interface 402 with a signature (e.g., a hash or other cryptographic identifier generated form one or more data field values, such as a hash value or other identifier computed from a concatenation of the data fields of message 602). This identifier, as discussed herein, may be later recomputed by other systems to verify event message contents are free from changes or alterations.

However, when not permissible, this determination is communicated in a feasibility response 504-B to the product level event interface 402. In some embodiments, when a lack of feasibility is detected, a reason may be communicated with the lack of feasibility to enable the product level interface to determine if a new feasibility request/asset movement can be submitted.

In response to a feasibility response 504-A, the product level event interface 402 generates and sends asset movement request 506 to the assets interface 408. The asset movement request 506 is formatted according to event message 602 and includes the signature previously generated by the assets interface 408. This enables the assets interface 408 to check that the asset movement request corresponds with the data for which feasibility was previously determined. When there is a match, an asset_movement_ID (e.g., asset_movement_ID) is returned with a success message 508-A. However, if there is a signature mismatch, or the requested asset movement has become impermissible, a failure message 508-B is returned to the product level event interface 402 by the assets interface 408, with a reason (e.g., error code, metadata, etc.) that describes the failure. The assets interface 408, upon confirming success of a requested asset movement, then processes the asset movement request as discussed above in FIG. 4 and below in FIG. 7.

Figure 7:
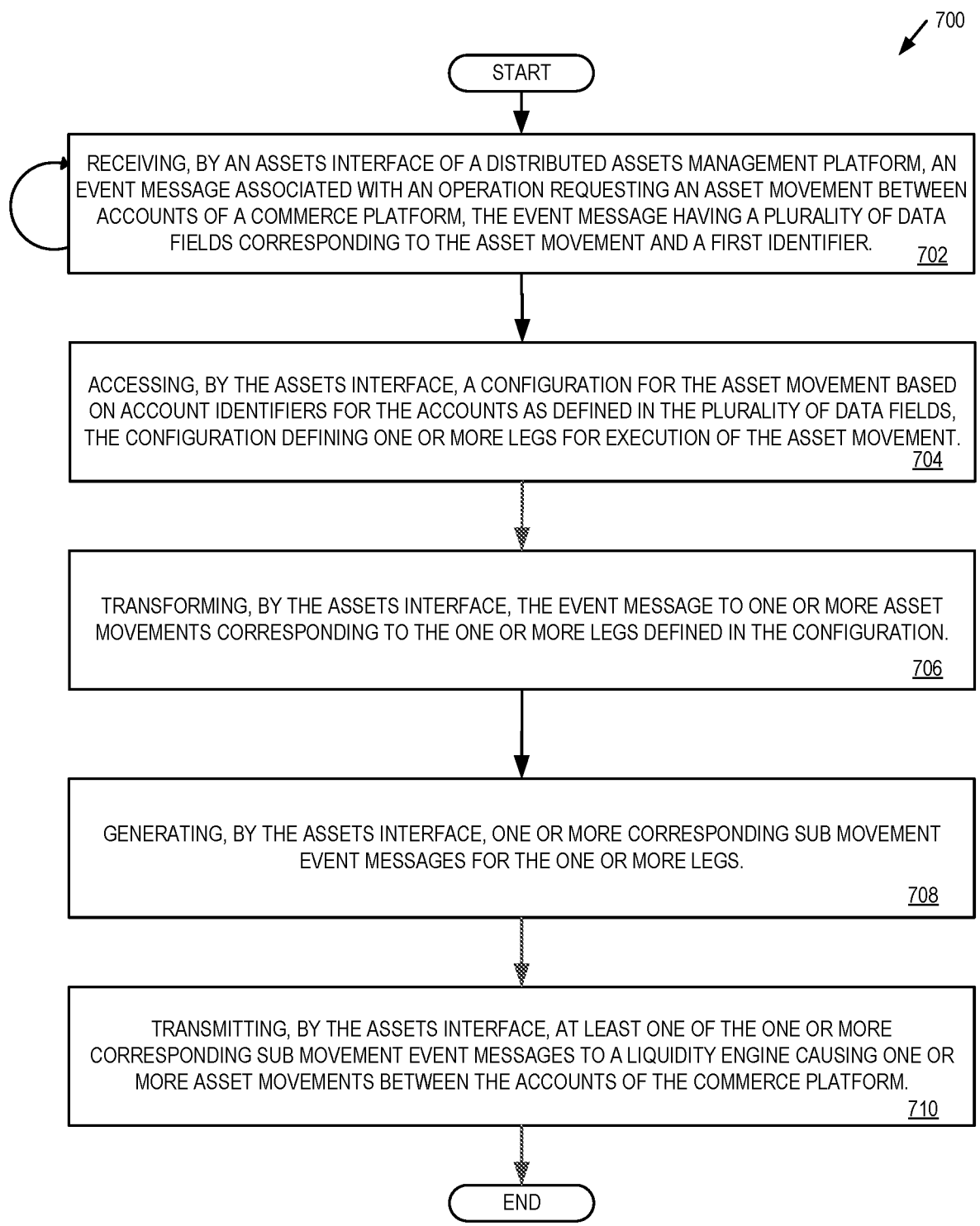
FIG. 7 is a block diagram of a process performed by an assets interface for processing an event message for a distributed assets management platform.

FIG. 7 is a block diagram of a process 700 performed by an assets interface for processing an event message for a distributed assets management platform. The process is performed by processing logic that may comprise hardware (circuitry, dedicated logic, etc.), software (such as is run on a general-purpose computer system or a dedicated machine), firmware, or a combination. In one embodiment, the process is performed by assets interface 408.

The process begins with processing logic receiving, by an assets interface of a distributed assets management platform, an event message associated with an operation requesting an asset movement between accounts of a commerce platform, the event message having a plurality of data fields defining the asset movement and a first identifier (e.g., a globally unique identifier) (processing block 702). As discussed herein, the event message is in a standardized format of an API-based message that includes a plurality of fields, as discussed in greater detail above in FIG. 6. Furthermore, by using the API-based messaging, development effort for integration of systems with the assets interface is reduced, therefore enabling more efficient and widespread integration to various services discussed herein.

Processing logic then accesses, by the assets interface, a configuration for the asset movement based on account identifiers for the accounts as defined in the plurality of data fields, the configuration defining one or more legs for execution of the asset movement (processing block 704). In embodiments, the event message defines source and destination bank accounts for the requested asset movement, which defines the requested route of the asset movement. The route information thus enables processing logic to access a configuration for the movement that defines whether such a movement is allowed, whether the movement is subject to splitting (e.g., dividing the original movement into a set of sub movements that collectively result in the original movement, or dividing the movement for other purposes such as to satisfy regulatory rules, reduce fees, etc.).

The configuration for the event message, as well as for other messages, enables processing logic to transform, by the assets interface, the event message to one or more asset movements corresponding to the one or more legs defined in the configuration (processing block 706). Therefore, the accessing and transformation enables the original event message to spawn a set of asset movement events that ensure regulatory compliance, ensure internal policies with respect to asset movements, represent a more efficient asset movement, reduce fees associated with the asset movement, split the asset movement into a set of asset movements (e.g., a primary movement, a surcharge movement, a split between accounts, etc.). In other words, the configuration enables a more precise and/or preferred routing of the asset movement according to the regulations, policies, and goals to which the distributed assets management platform is subjected.

Processing logic then generates, by the assets interface, one or more corresponding sub movement event messages for the corresponding one or more legs (processing block 708). In embodiments, the one or more sub movements may include a plurality of sub movements, each having an implication (e.g., an asset movement and/or an exchange implication). Thus, the splitting and/or transformation of the original movement to a set of movement event messages enable more fine grained and accurate processes of liquidity processing and exchange exposure mitigation, as discussed herein.

Processing logic then transmits, by the assets interface, one or more of the one or more corresponding sub movement event messages to a liquidity engine (and/or optionally to an exchange platform) to cause one or more asset movements between the accounts of the commerce platform. (processing block 710). In some examples, the accounts correspond to the account identifiers and/or asset movements are made in response to the sub movement event messages. The transmission of the sub movement event messages initiates the liquidity engine's movements of assets between accounts, and the exchange platform's trading, and therefore causes the realization of the more accurate and fine grained asset movement processes discussed above.

Hydration System

As discussed herein, event messages are used to interface with the distributed assets management platform 200. The event messages are defined to include a plurality of fields, such as source and destination bank accounts, credit and debit amounts, timing information related to a requested asset movement, and globally unique identifier(s) that identify the requested asset movement and also enable integrity checking. The event message formatting and fields are discussed above in greater detail with respect to FIGS. 5 and 6.

In embodiments, at the time an event message is generated by a service system and transmitted to the assets interface 208 of the distributed assets management platform 200, not all data fields of the message are known. In some examples, for every product event creating asset impact, there is timing associated with events (e.g., not just where and what accounts, but when is the asset impact going to happen). As a more concrete example, a charge event may occur at time A, with actual charge occurring at time X in the future, and the payout occurring at time Y in the future. This information may not be known at the time the event is generated, but is relevant to the event's impact and thus the proper operation of the liquidity engine 220 and exchange platform 218. In other words, to properly and accurately account for account liquidity, knowing when credits and debits will occur, and at what accounts, is vital. Furthermore, the exchange exposure is also impacted by the timing that defines how exchange exposure is accumulated in different currencies, across entities of the commerce platform, and thus how and when trading should occur.

In embodiments, the primary unknown data fields are timing data fields, and thus the embodiments and examples discussed below use timing information as the incomplete data fields rehydrated through the processes of the hydration system. However, in some examples, any data field except for the globally unique identifier that identifies the event message may be rehydrated using the processes discussed herein. In some embodiments, amounts in an event message can start out as placeholders and be subsequently updated. In some examples, in transactions where an asset exchange occurs, the rate presented may be different from what is actually settled (e.g., only known at a later time). Thus, in some examples, placeholder values can initially include what is presented and be updated by the hydration system with an actual settlement amount. More concretely, an asset movement can include $50 USD for an item sold at £65 gbp to a UK user. Internally, a placeholder value starts out as $50 USD. Then, when a later exchange is performed to transform the asset to a UK equivalent, a rate used can be slightly different, resulting in an actual settlement amount of $49.97 for the £65 gbp. In embodiments, the hydration system uses the processes discussed herein to enable the hydration using the settlement amount once actual settlement reporting is observed. In some examples, the hydration system can also help with hydrating (or completing incomplete data for) specific attributes of transactions. In this example, a placeholder can be received that designates the COST for a txn_123, where the actual cost is unknown at the time the event message is created. The hydration system can observe and/or obtain the actual cost from an appropriate data source, as discussed herein.

Figure 8:
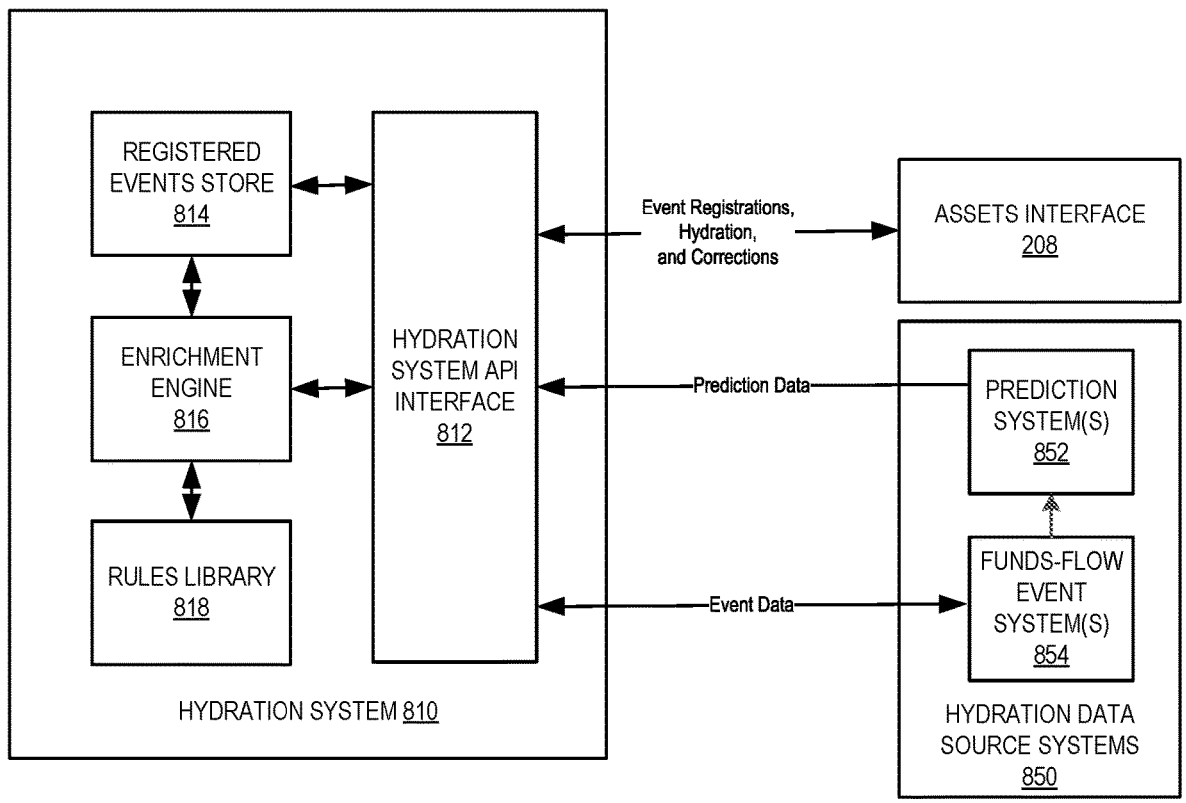
FIG. 8 is a block diagram of a hydration system of a distributed assets management platform.

FIG. 8 is a block diagram of a hydration system 810 of a distributed asset management platform. The hydration system 810 provides additional details for the hydration system 210 discussed above in FIG. 2.

In embodiments, the hydration system 810 enables event messages to be generated and processed by the assets interface 208 even with incomplete information, such as unknown credit and debit timing (see, e.g., FIG. 6). Rather, the assets interface 208 detects event messages with placeholder values, as discussed above. The placeholder values may be predefined data values (e.g., a zero value or negative value for a timestamp, a data object inserted in place of a timestamp value, etc.) used in place of an actual data value. In some embodiments, the assets interface 208 therefore generates and transmits a registration request to the hydration system API interface 812. The registration request is an API based request transmitted to an endpoint exposed by the hydration system API interface 812, and the API based request includes at least the globally unique identifier or the event message, which disambiguates each event message from one another and is used by the other systems of the distributed asset management platform 200 to identify individual events and sub events.

Data from the registration request is then stored in the registered events store 814. This data store stores the missing or incomplete data fields of an event message along with the globally unique identifier. The registered events store 814 is a temporary storage for registration requests while data hydration (e.g., obtaining and updating the unknown data fields) occurs, as discussed herein.

In embodiments, the hydration system API interface 812 receives a stream of event messages from the hydration data sources 850. The hydration data sources 850 include a plurality of sources that generate and/or supply potentially relevant data, such as timing information for asset movements. The hydration data sources 850 include one or more prediction system(s) 852 and the funds-flow event system(s) 854. As discussed above, the funds-flow event system(s) 854 are systems of a commerce platform 110 that are responsible for performing processes and generating events that perform the various services, discussed above with respect to service system(s) 112. These events and messages related to the events are communicated between one another and/or stored in one or more data stores maintained by the commerce platform 110. In embodiments, the hydration system API interface 812 monitors the event messaging and data sources, such as listening or monitoring messages transmitted over an internal events bus or network, generating and transmitting data requests to data repositories of service systems, etc. for the globally unique identifiers of the registered event messages to detect whether potentially relevant information may be available from the messaging and/or data stores. Potentially relevant information is data that is also identified using the globally unique identifier to confirm that the data belongs to a relevant registered event message. In some embodiments, the information is the realized or actual timing information generated in the course of a transaction.

The hydration system API interface 812 notifies the enrichment engine 816 when a potentially relevant event is detected. The enrichment engine 814 then determines, from the registered events if the unknown data is included in the monitored event. In some examples, if a departed at timestamp is missing from a registered event message, and the departed at timestamp is detected in a message exchange and/or data store in association with a matching globally unique identifier, the enrichment engine 816 can update the registered event data.

The hydration data sources 850 also include one or more prediction system(s) 852. The prediction system(s) 852 includes one or more machine learning model (MLM) based prediction systems that are pre-trained to estimate timing parameters of events, such as departed at and arrival by timestamps. In some examples, accurately predicting settlement delays and timing enables the hydration system 810 to determine when assets from card-based transactions will be available in its accounts. The hydration system 810 therefore utilizes the prediction system(s) 852 to hydrate or refresh event messages to maintain a certain level of liquidity to meet its immediate obligations, including customer withdrawals or refunds, which are managed by the liquidity engine 220, as discussed herein. Predictive models of the safeguarding system 226 enable the organization to plan for these liquidity requirements by providing a reliable forecast of asset inflows from settlements. Moreover, in situations where customer funds are to be held in segregated accounts, knowing the settlement times helps verify that these accounts are adequately funded in compliance with regulatory requirements. To address these and other problems the prediction system(s) 852 estimates delays in the settlement of transactions (e.g., credit card transactions) and considers various factors such as non-transfer days (e.g., holidays), which can affect settlement timing and may vary from country to country and year to year. The prediction system(s) 852 may include the machine learning model trained with historical transaction data, including details such as the time of the clearing request, the day of the week of the clearing request, the country, and/or currency involved, as well as the actual delay experienced between the clearing request and the settlement. The prediction system(s) 852 use the machine learning model(s) to predict various event related information, such as a settlement time, transfer time, predicted delay for a given transfer, and may adjust the predicted transfer delay to account for any varying non-transfer days (e.g., holidays) during the predicted settlement period. In this manner, the hydration system 810 may hydrate or refresh event messages with highly accurate predicted asset movement information, such as timing information, settlement day information, exchange information, etc. to downstream systems that rely on such information, such as the liquidity engine 220 and the exchange platform 218, as discussed herein. In this manner, the hydration system 810 and the prediction system(s) 852 improve processing, memory, and/or communication resources utilized by the distributed assets management platform 200 by reducing or eliminating the need for corrections and/or reducing an amount of additional corrections, such as those discussed above with respect to the assets interface 408.

The MLM based prediction systems are periodically trained/retrained using annotated past actual events and the ultimately determined timing information from those events, as well as a set of input data for each event (e.g., transaction types, service systems involved, accounts involved, whether there is an exchange exposure, time of a transaction, time of year, acquiring country, country of customer to a transaction, the customer's acquiring bank, country of a payments processes, as well as other potentially relevant inputs. The MLM based prediction system(s) 852 can include neural network based model(s), generative model(s), models that include seasonality analysis, ensembles of model(s), etc. Then, the MLM based prediction system(s) 852 are recursively trained/retrained to enable the prediction system(s) 852 to obtain input data related to events, and generate predicted output indicative of event timing information. In some embodiments, once trained, the prediction system(s) 852 obtains input data from the funds-flow event system(s) 854 for input into the trained MLMs. The timing information tied to the globally unique identifiers for the events for which the predictions are then generated by the MLMs of the prediction system(s) 852, and are transmitted as prediction data in an API based message to the endpoint of the interface 812. The enrichment engine 814, similar to the discussion above, determines from the registered events if any unknown data is included in the predictions.

In some embodiments, the enrichment engine 816 is further configured to add a default data value to a registered event message, such as default timing information that can serve to complete a registered event message in the event there are no predictions or event system messages obtained for the identified registered event message within a predetermined time period, such as the time period for which a registered event message is maintained in the data store 814. In some embodiments, such default values may represent statistical estimates computed from past event messages.

As discussed in the embodiments above, there are multiple data hydration sources which may lead to different hydration data for the same registered event message. Therefore, a registered event message is maintained in the data store 814 for a predetermined time period even when unknown data is obtained via the hydration sources and updated with the now obtained data. In embodiments, the enrichment engine 816 consults the rules library 818 to determine precedence of various data sources. The various data sources, such as MLM prediction based data sources, the funds-flow event system data sources, and default values may be associated with a hierarchical order of preference. In some examples, actual data from a funds-flow event system is preferred over a prediction data source's data which is preferred over a default data value. Therefore, the rules engine 818 serves as a selection mechanism to enable more preferred data source data values to be selected, and update registered event message data, by the enrichment engine 816. Beneficially, the most preferred data source is used by the hydration system to hydrate the registered event messages before returning the hydration results to the assets interface 208. The assets interface 208 may then forward the fully hydrated event message to the liquidity engine 220 and/or the exchange platform 218, as discussed herein.

In embodiments, and as discussed above, the registered event message may be maintained for a period of time at which one or more predictions, the funds-flow event system messages, and/or default values may be applied to a registered event message in the data store 814. In some embodiments, the enrichment engine 816 further stores a source of obtained data fields (e.g., as a default value, prediction, or actual event message). Thus, in this embodiment, hydrated data may be released immediately to the assets interface 208 by the enrichment engine 816. However, when subsequent and more preferred data field values are obtained within the time period the registered event message is maintained, the enrichment engine 816 updates the corresponding record in the data store 814 and issues a correction. The correction is transmitted to the assets interface 208, enabling the assets interface to propagate the corrected data to the liquidity engine and/or the exchange platform, which retract the old event (using the older and/or less preferential source of hydrated data) and add a new event (using a more preferred source of hydrated data).

After the predetermined time period for a registered event message, the enrichment engine 816 clears the record for the registered event message from the data store 814. As discussed above, at the expiration of this time either a default value is used to hydrate any still unknown data fields (e.g., those still having a placeholder value), or a previously obtained predictions or observed values have hydrated the previously unknown data fields.

Figure 9A:
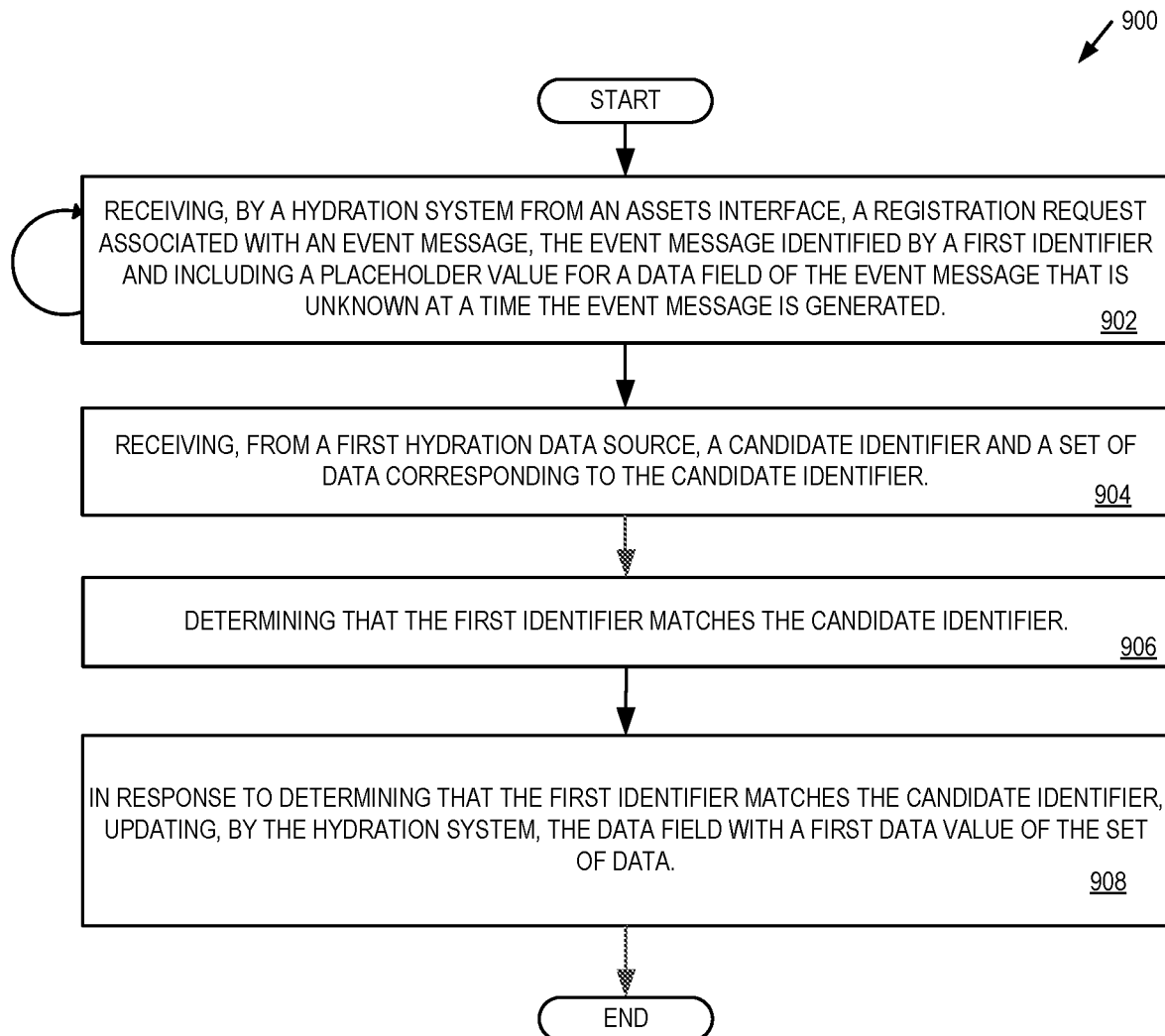
FIG. 9A is a block diagram of a process performed by the hydration system for performing hydration of event data, for instance, during distributed asset management.

FIG. 9A is a block diagram of a process 900 performed by the hydration system for performing hydration of event message data, for instance, during distributed asset management. The process is performed by processing logic that may comprise hardware (circuitry, dedicated logic, etc.), software (such as is run on a general-purpose computer system or a dedicated machine), firmware, or a combination. In one embodiment, the process is performed by a hydration system (e.g., hydration system 810 or 210).

The process begins with processing logic receiving, by a hydration system from an assets interface, a registration request associated with an event message, the event message identified by a globally unique identifier and including a placeholder value for a data field of the event message that is unknown at a time the event message is generated (processing block 902). In embodiments, the registration request indicates that data in an event message is unknown and serves as a request to obtain the unknown information. As discussed herein, the timing information with events is typically unknown or partially known at the time of the event message's generation. In some examples, an event message includes fields for departed-at and arrival-by timing for debiting and crediting assets according to a corresponding event. However, the actual timing of this information may be unknown, and the registration request initiates the process of obtaining and hydrating missing data so that processing of the event message by downstream systems, such as a liquidity engine and/or the exchange platform can proceed.

Processing logic receives, from a first hydration data source, a candidate identifier and a set of data corresponding to the candidate identifier (processing block 904). The identifier and/or set of data may be received from various hydration data sources, such as MLM prediction systems and/or services that generate data within a commerce platform. Beneficially, and as discussed herein, each hydration data source may be associated with a relative level of preference enabling the obtaining and usage of data values from preferred data sources. In some examples, the candidate identifier and set of data are stored. The storage is for a predetermined length of time in which hydration of the data field can occur. Furthermore, by storing for a time period, one or more hydration data sources may supply a missing data value enabling processing logic, as discussed above and below in FIG. 9B, the ability to correct downstream systems with a later received and updated/corrected data value.

Processing logic determines that the first identifier matches the candidate identifier (processing block 906).

Processing logic then, in response to determining that the first identifier matches the candidate identifier, updates, by the hydration system, the data field with a first data value of the set of data (processing block 908). The updating causes the previously unknown data field to be filled, thus transforming the event message from incomplete to complete (along with the hydration of other missing data fields as needed).

In some examples, as part of updating the data field, processing logic transmits, from the hydration system to the assets interface, an update to the event message that comprises the data field updated with the data value causing one or more of a liquidity engine to move assets based at least in part on the event message having the updated data value and/or an exchange (e.g., a foreign exchange) to perform an exchange (e.g., a currency exchange) based at least in part on the event message having the updated data value. Therefore, the updating and transmission of the update to the event message enables the event message to be updated with the data needed for processing of the asset movement event. That is, systems such as the liquidity engine rely on the timing information to properly account for liquidity between accounts to know not only what amounts should be transferred between accounts, but also when such transfers are to occur.

Figure 9B:
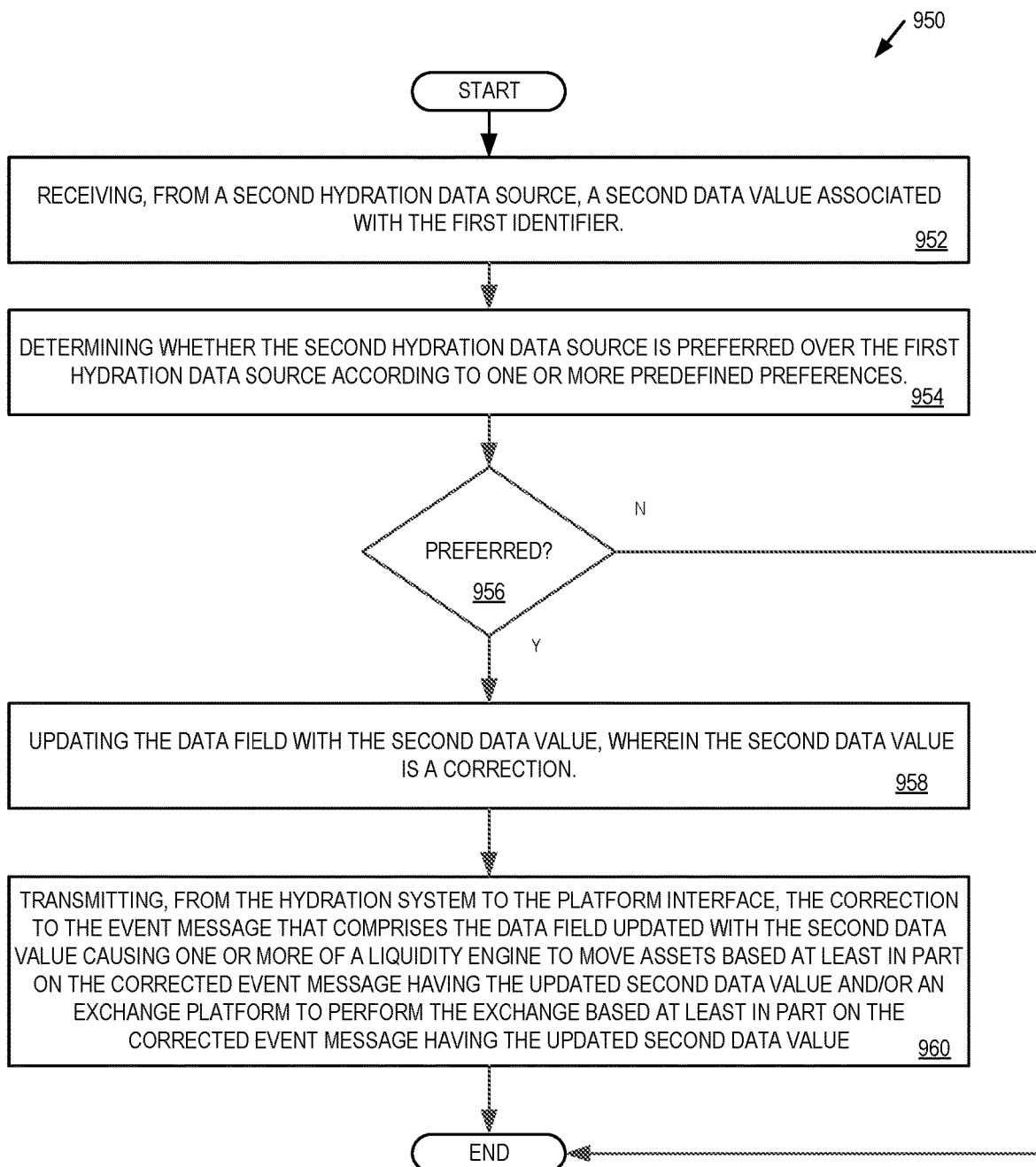
FIG. 9B is a block diagram of a process performed by the hydration system for performing a correction of a prior hydration of asset interface event data during distributed asset management.

Processing logic obtaining and filling in this information for an assets interface of a distributed asset management platform ensures that the data used for liquidity management and exchange exposure mitigation is the most up to date and accurate information available. To that end, FIG. 9B is a block diagram of a process 950, which is performed after the process 900 of FIG. 9, and is performed by the hydration system for performing a correction of a prior hydration. The process is performed by processing logic that may comprise hardware (circuitry, dedicated logic, etc.), software (such as is run on a general-purpose computer system or a dedicated machine), firmware, or a combination. In one embodiment, the process is performed by a hydration system (e.g., hydration system 810 or 210).

The process begins with processing logic receiving, from a second hydration data source, a second data value associated with the first identifier (e.g., a globally unique identifier) (processing block 952). As discussed above, an event message is registered for hydration and is maintained for a period of time. This period of time enables processing logic to receive additional hydration data which may or may not be more preferred. Such preferences may be based on reliability of data sources and/or accuracy of supplied information. Thus, receipt and use of such later obtained information enables corrections to be made that improve the accuracy of the timing requirements, and thus the processes performed that rely on this reported information, as discussed herein.

Processing logic then determines whether the second hydration data source is preferred over the first hydration data source according to one or more predefined preferences (processing block 954). In embodiments, a rules library having a rule set is maintained, wherein the rules define preference rules associated with hydration data sources relative to one another. In some examples, the rules library may maintain a hierarchical listing of hydration data sources, a plurality of hierarchical listings each associated with a different transaction type (e.g., different hierarchies reflecting different preferences for different transaction types), merchant specific hierarchical listings, product or service system hierarchical listings, etc. Additionally, the preferences may be defined in non-hierarchical manners, such as programmatic (e.g., a preferred source selected based on a mapping of a transaction parameter, such as merchant, to a preferred hydration data source system), heuristic (e.g., a rule-based approach that selects a preferred source or hierarchy based on a transaction parameter, such as origin location, clearing bank, merchant, etc.), as well as other forms of preference selection.

Processing logic uses the one or more predefined preferences to determine if the second hydration data source is preferred over the first hydration data source system (processing block 956). When it is not, the process ends. However, when the second hydration data source is determined to be preferred over the hydration data source, processing logic proceeds to block 958.

Processing logic generates a second update to the data field. That is the data field is updated with the second data value to provide a correction (processing block 958). Since the second hydration data source is preferred, the correction of the event message data enables the event to be corrected downstream (e.g., at an assets interface, and potentially at a liquidity engine and/or exchange platform). Such downstream corrections that true up the downstream values enable the data values upon which the downstream systems operate to be more accurate. Thus, processing logic transmits, from the hydration system to the assets interface, the correction to the event message that comprises the data field updated with the second data value causing one or more of: a liquidity engine to move assets based at least in part on the corrected event message having the updated second data value and/or an exchange to perform an exchange based at least in part on the corrected event message having the updated second data value (processing block 960).

Exchange Platform

In embodiments, as discussed herein, certain transactions or product level events processed by the assets interface 208 have an exchange exposure or implication, such as a foreign exchange exposure. In some examples, an assets movement to be performed in response to an assets movement event by liquidity engine 220, may include source and destination accounts associated with different currencies, credit and debit amounts denominated in different currencies, and/or locations of entities associated with the transaction and their accounts located in or otherwise associated with geographic regions having different currencies. In other words, an assets exchange occurs during a transaction, which may add or subtract a currency level in a source or destination account, which is referred to herein as an assets exchange exposure or a foreign exchange exposure. Then, in some examples, the foreign exchange exposure may move past an acceptable level of risk for an entity associated with an account, as defined by a commerce platform 110, in which case an exchange of assets should occur to mitigate the exchange exposure. The liquidity engine 220 is informed of the trade to ensure assets are physically moved between accounts according to the assets exchange. Embodiments of an automated exchange platform 1010 having an exchange pipeline 1020 to perform currency trades/exchanges is discussed in greater detail below.

Figure 10:
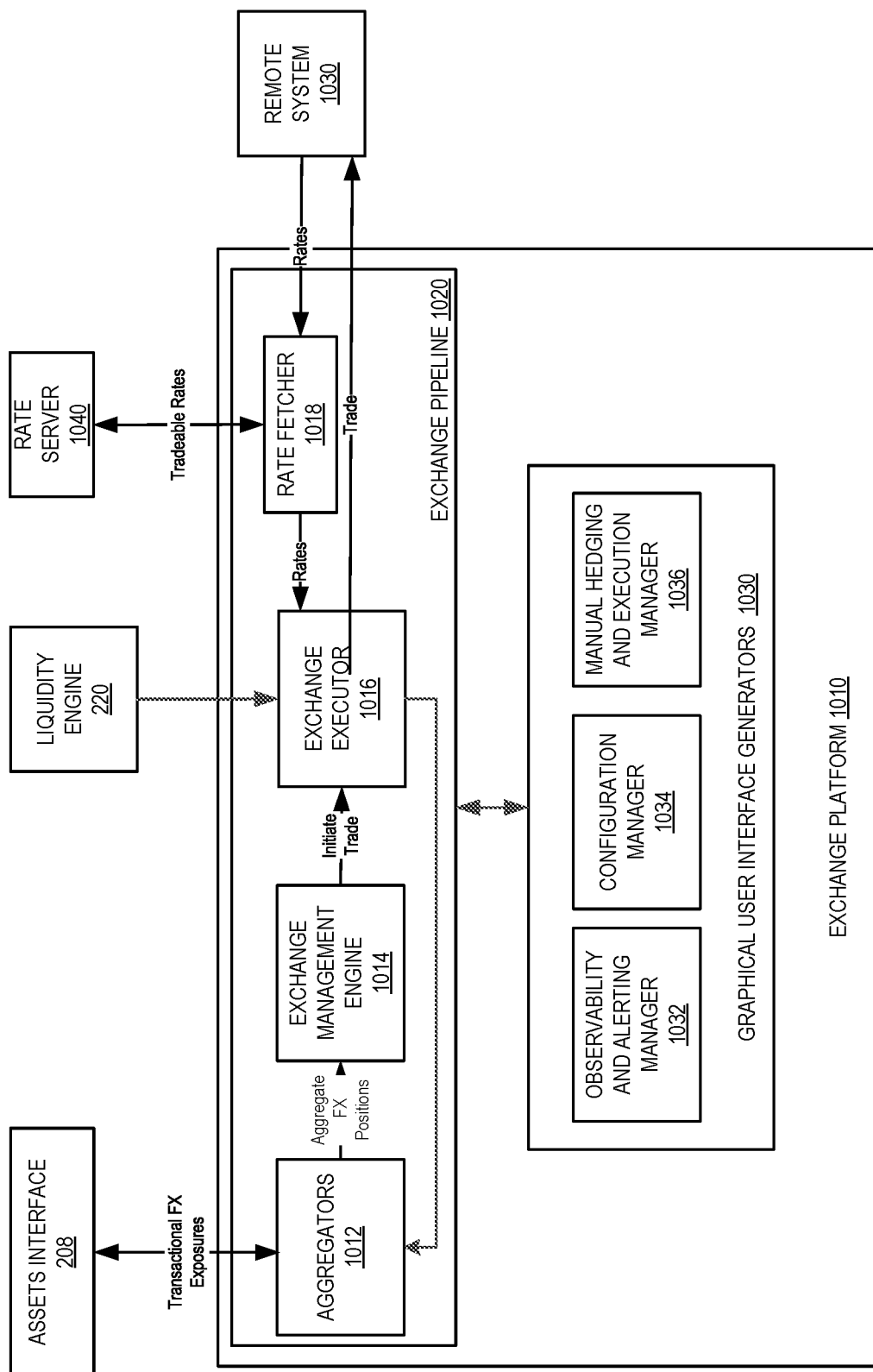
FIG. 10 is a block diagram of an exchange platform of a distributed assets management platform.

FIG. 10 is a block diagram of an exchange platform 1010 of a distributed assets management platform. The exchange platform, also referred to as an exchange platform herein, provides additional details for the exchange platform 218 discussed herein.

The exchange platform 1010 includes an exchange pipeline 1020 for performing automated, programmatic, and intelligent foreign exchange trades that exchange assets. In some embodiments, the exchange pipeline 1020 includes the aggregators 1012 that receive a stream of event messaging from the assets interface 208. As discussed herein, the assets interface detects when product level events for transactions include an assets exchange exposure, such as to source and destination accounts being associated with different currencies, credit and debit amounts being denominated in different currencies, or other conditions indicative of a change in currency of assets during a transaction. In some examples, a platform flows interface event message (e.g., message 602) may indicate that SBA_1 and SBA_4 are associated with different currencies, the amounts in the src_amount and dest_amount fields are denominated in different currencies, etc. When this occurs, the assets interface 208 transmits the exposure (e.g., accounts, currencies, and amounts) of the exposure, which is received by the aggregators 1012. A stream of such exposure messages is transmitted by the assets interface 208 and received by the aggregators 1012. In embodiments, the aggregators 1012 receive the stream of exposure events by exposing an API endpoint, and receiving the exposure event messages as API based messages at the endpoint exposed by the aggregators 1012.

In response to receipt of the stream of exposure messages indicating accounts, currencies, and amounts, the aggregators 1012 are responsible for performing a per-entity aggregation of exchange exposure using the stream of exposure messages. That is the commerce platform 110 may include a plurality of entities associated with one or more accounts as account owners. Examples of such entities include product level entities (e.g., entities for charge products, subscription products, etc.), legal entities (e.g., corporate, tax, or other entities), geographic entities (e.g., an entity located in Country X with accounts also located in and storing data in a corresponding country), or a combination of entities. In embodiments, the aggregators 1012 perform a plurality of aggregation process of exchange exposures per entity to determine the overall exchange exposure of the entity over time. The aggregated exchange exposures are periodically (e.g., every second, minute, hour, day, etc.) transmitted to the exchange manager 1014.

The exchange manager 1014 is responsible for detecting when an exchange of assets, such as a currency exchange, should be initiated. In some embodiments, the exchange manager 1014 includes processing logic, such as one or more models, heuristics analysis logic, thresholds, etc. that detect one or more of a time of exposure, an amount of exposure, volatility of a market (e.g., rate fluctuation of a market to which a currency exchange is directed as reported by a banking system, a $3^{rd}$ party system, or otherwise tracked by the exchange manager 1014), anomaly detection logic (e.g., logic that tracks average exposures over time to detect when a current exposure or rate of change of exposure exceeds a limit, such as a percentage of total exposure, rate of change of exposure greater than X currency over time, etc.) indicative of different forms of risk of a current exchange exposure. The exchange manager 1014 uses the logics to detect when asset exchanges should occur to mitigate the detected risk(s). In embodiments, each of these logics or combination of logic compares their detected values (e.g., exposure amount per entity, exposure at time T per entity, market condition exceeds a swing amount, exposure greater than X % of average exposure, etc. indicative of risk) to a set of configurable threshold values.

In some embodiments, the configuration manager 1034 of the graphical user interface generators 1030 generates a user interface rendered on an operator's computing system enabling the operator to visualize, set, save, and change the thresholds and/or exchange types used by the exchange manager 1014. Furthermore, in response to a detected aggregated exchange exposure satisfying a threshold, a volatility event occurring, an anomaly in exchange exposure being observed, etc., the observability and alerting manager 1032 may generate one or more alerts (e.g., email messages, instant messages, text messages, MMS messages, etc.) to one or more predefined operators, such as the operator that is tasked with the review, changing, and setting of threshold values for the logic of the exchange manager 1014, enabling a fine grained tuning of exchange exposure risks associated with one or more entities of a commerce platform 110. Furthermore, in some examples, the alerts may also be rendered within a graphical user interface served to the operator.

In response to detecting a triggering event, such as an aggregated exchange exposure for an entity satisfying a condition at the exchange manager 1014, the exchange manager 1014 sends an exchange initiation request to the exchange executor 1016. In some embodiments, a type of asset exchange, such as an immediate on the spot asset exchange based on current rate, a level order (e.g., triggered based on a favorable and/or unfavorable threshold value(s), an periodic schedule, an asset based threshold (e.g., a total amount of assets of a specific type), asset exchange conditions hedged by an external source, etc. can be indicated with the request. The exchange initiation request includes the source and destination accounts for which exposure is detected, an amount to be exchanged in order to reduce the exchange exposure, and in some embodiments, an exchange type. The exchange executor 1016, upon receiving the exchange initiation request generates and transmits a currency exchange trade request, also specifying the source and destination accounts, the currencies to be exchanged, and the amount of the exchange (e.g., exchange $X EUROs to USD from Acct_1 to Acct_4). The assets exchange is then sent to a remote system 1030, such as a foreign currency exchange system, a banking system, etc., capable of processing the requested assets exchange.

During the exchange requested by the exchange executor 1016, rates of the exchange are provided to the rate fetcher 1018 for the current exchange, and then stored in the rate server 1040. In some embodiments, a rate of the exchange and a quote for the rate by the remote system 1030 are required data within the exchange request. Thus, the exchange executor 1016 will finalize and process the assets exchange once the rates and rate quote identification are obtained and returned to the remote system 1030. The remote system 1030 accordingly performs the exchanges of the assets in the accounts, for the amounts and currencies, at the quoted rate, which is confirmed to the exchange executor 1016.

In response to the exchange executor 1016 determining that the trade has been executed and currencies exchanged in one or more accounts, the exchange executor 1016 generates a liquidity event (e.g., specifying the assets exchange of the currency trade, the accounts impacted, the amounts, and the timing of when the trade was executed). The liquidity event message is communicated to the liquidity engine 220 that accumulates the liquidity events and performs asset movements according to the events, as discussed above to move assets to and from accounts so that assets are in accounts of the commerce platform at the appropriate times.

In embodiments, as discussed herein, the exchange platform 1010 operates independently of the liquidity engine 220 to enable management of exchange exposure risks independent of the liquidity engine 220. Furthermore, by providing for autonomy of the exchange platform 1010 and the liquidity engine 220, asset exchange detection and execution occur when such an exchange is determined to best manage exchange risk.

Furthermore, in some examples, the graphical user interface generators 1030 are discussed above to provide observability, alerting, and configuration control of the exchange management logic(s) to ensure there is end-to-end visibility and management control over the exchange pipeline 1020. In embodiments, the graphical user interface generators 1030 further includes a manual hedging and execution manager 1036. The manual hedging and execution manager 1036 renders a graphical user interface for a computer system of an operator which enables the manual initiation of asset exchanges. In some examples, a scenario may arise where real world market conditions are rapidly changing such that one or more asset exchanges should be immediately initiated. Rather than waiting for the aggregators 1012 and the exchange manager 1014 to trigger an exchange based on the programmatic conditions discussed above, the operator may manually enter an exchange that specifies accounts, trade amount, and timing of the requested exchange before an exchange condition is detected by the exchange manager 1014. This manual exchange request is provided to the exchange executor 1016, similar to the exchange initiation messages received from the exchange manager 1014, causing the exchange executor 1016 to execute an assets exchange as discussed herein. The manual hedging and execution manager 1036 serves as a failsafe to enable asset exchange execution in a more timely manner and/or as decided upon by one or more operators of the exchange platform 1010. Furthermore, by including a manual trade initiation pathway to the exchange pipeline 1020, there is full end-to-end trade control, configuration, observability, and thus risk management, of the exchange exposures and asset exchanges processed by the exchange platform 1010.

Figure 11:
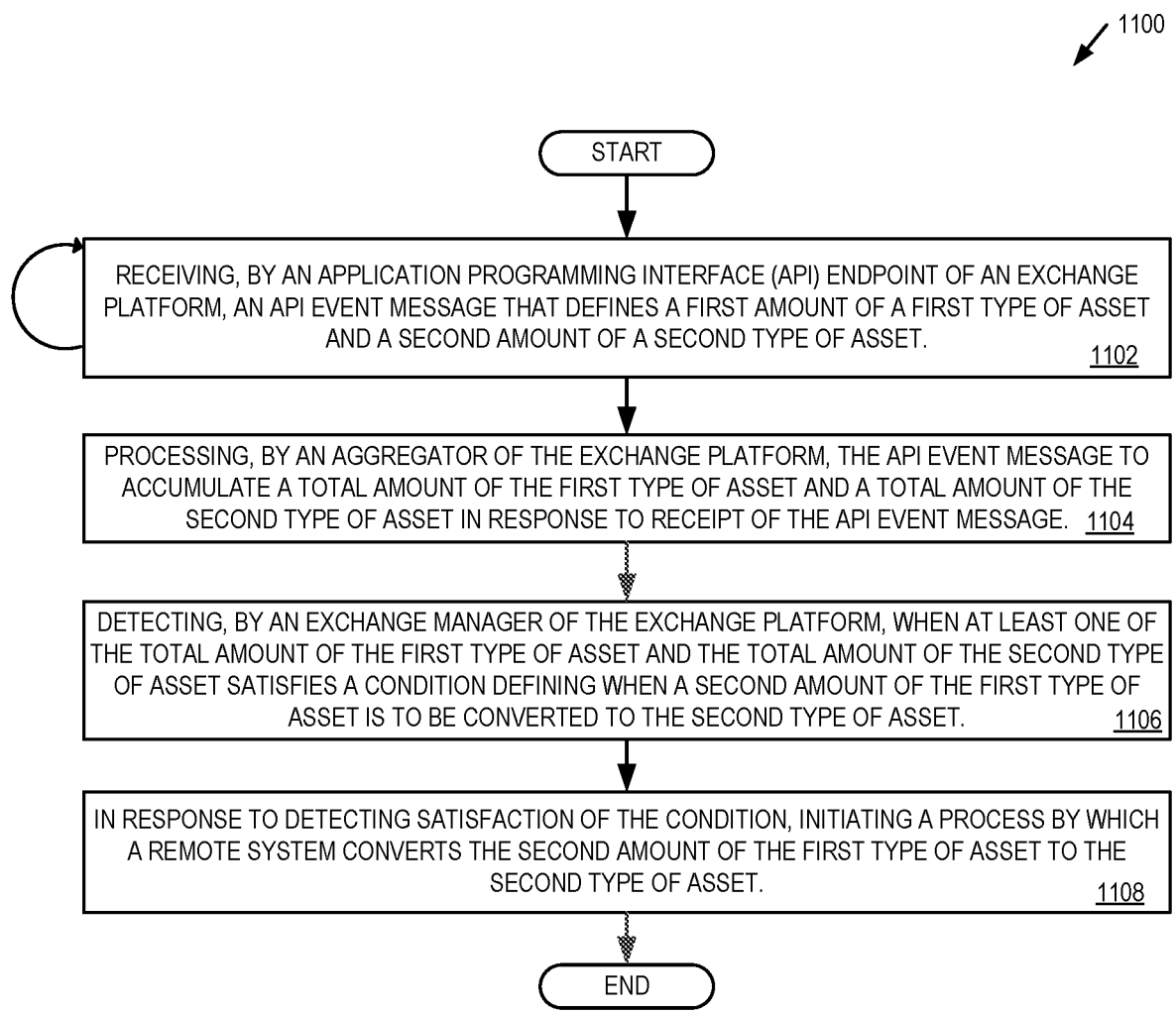
FIG. 11 is a block diagram of a process performed by an exchange pipeline to perform asset exchanges during distributed assets management.

FIG. 11 is a block diagram of a process 1100 performed by an exchange pipeline to perform asset exchanges during distributed assets management. The process is performed by processing logic that may comprise hardware (circuitry, dedicated logic, etc.), software (such as is run on a general purpose computer system or a dedicated machine), firmware, or a combination. In one embodiment, the process is performed by an exchange platform (e.g., platform 218 or 1010).

The process begins with processing logic receiving, by an application programming interface (API) endpoint of an exchange platform, an API event message that defines a first amount of a first type of asset and a second amount of a second type of asset (processing block 1102). In some embodiments, the API event message is one of a stream of API event messages, where the message stream, as discussed herein, is generated by a platform interface in response to product level event messages (e.g., message 602 in FIG. 6 generated to reflect a transaction initiated by a product/service system of a commerce platform) in which an exchange exposure is detected. Such an exposure is detected when there is a difference in currencies of a source and destination account, credit and debit accounts, or other information indicative of different currencies in a transaction. The stream of messaging enables an exchange platform executing the processing logic to receive, consume, and account for exchange exposures as they are incurred/generated by the products of the distributed service systems of the commerce platform, providing for faster and more accurate accounting of exchange exposures.

Processing logic processes, by an aggregator of the exchange platform, the API event message to accumulate a total amount of the first type of asset and a total amount of the second type of asset in response to receipt of the API event message (processing block 1104). As discussed herein, a commerce platform includes a plurality of different entities, such as legal entities, geographic entities, entities defined by products/service systems. In embodiments, each entity has its corresponding exchange exposure aggregated by processing logic as different entities may have different conditions for detecting when to initiate a trade. In some examples, a juristic or legal entity based in the UK may prefer to have account balances mostly in Euros, whereas a US based entity would prefer to have account balances in USD. Thus, the detection of when to perform an assets exchange and under what conditions can be more finely tuned by enabling each entity to accumulate and aggregate exchange exposure, as discussed herein. Furthermore, in some examples, processing resources of the server computer system may distribute the per-entity aggregation as tasks that are executed in parallel to make aggregation at scale more efficient as exchange volume for a particular entity increases and decreases.

Processing logic detecting, by an exchange manager of the exchange platform, when at least one of the total amount of the first type of asset and the total amount of the second type of asset satisfies a condition defining when a second amount of the first type of asset is to be converted to the second type of asset (processing block 1106). In embodiments, there are one or more exchange exposure conditions, such as thresholds where at least one threshold is applicable to an entity for which the per-entity exchange exposure has been generated. Thus, the threshold(s) enable different entities to be subject to their own unique conditions for detection of when an asset exchange can occur to provide for improved granularity in exchange exposure risk levels of different entities (e.g., entity A accepts more exchange exposure risk than entity B), and different risk levels for different conditions (e.g., entity A accepts more risk exposure for amount totals compared to exchange volatility), to improve the accuracy and effectiveness of exchange management across different entities. Furthermore, additional conditions, such as market volatility trade conditions and/or anomaly-based trade conditions may also be detected to determine when trades should occur. Furthermore, as discussed above, the exchange condition(s) are configurable to enable human operators the ability to fine tune various exchange conditions for individual entities.

In response to detecting satisfaction of the condition, initiating a process by which a remote system converts the second amount of the first type of asset to the second type of asset (processing block 1108). In embodiments, the plurality of per-entity aggregators, the exchange manager 1014 detecting when asset exchanges are to occur per entity, and then exchange executor processing asset exchanges enables a highly flexible asset exchange platform that can mitigate exchange risks by executing asset exchange processes on a per entity basis, at different times, and in response to different conditions for entity specific exchange risk mitigation and management. In embodiments, the execution of the exchange is communicated to a liquidity engine enabling the movement of physical assets, such as cash, between accounts in view of the executed assets exchange. However, the exchange platform operates independently of the liquidity engine to ensure independence of these systems, and thus more tunable, accurate, and scalable exchange processing. Furthermore, because the exchanges are executed per entity based on per-entity thresholds, a more accurate and more efficient reporting is provided to the liquidity engine across the balances of the accounts of the commerce platform.

As discussed herein, a distributed assets management platform of a commerce platform takes in product level event messages (e.g., a charge happened, a refund happened, a dispute happened, a subscription happened, a transfer between entities happened, etc.) as generated by distributed services of the commerce platform. The event messages are in a standardized format enabling an assets interface to interact with any number of different distributed service systems. The event messages may not be complete and thus a hydration system is provided to obtain any missing information and/or issue corrections as new information becomes available. Once hydrated, the event messages are converted to messages indicative of an asset movement having a asset movement impact suitable for providing to a liquidity engine causing physical asset movements between accounts based on those asset movement impacts, as well as to an exchange platform that programmatically, automatically, accurately, and at scale aggregates and exchanges assets to mitigate exchange exposures to which entities of the commerce platform are exposed. The distributed approach enables load balancing and distribution of resources for each of the subsystems of the distributed assets management platform 200 discussed above. Furthermore, the distribution of processes performed by the subsystems, as discussed in greater detail herein, enable integration with any services system, and improved accuracy and performance of asset tracking, movements, and exchanges.

Figure 12:
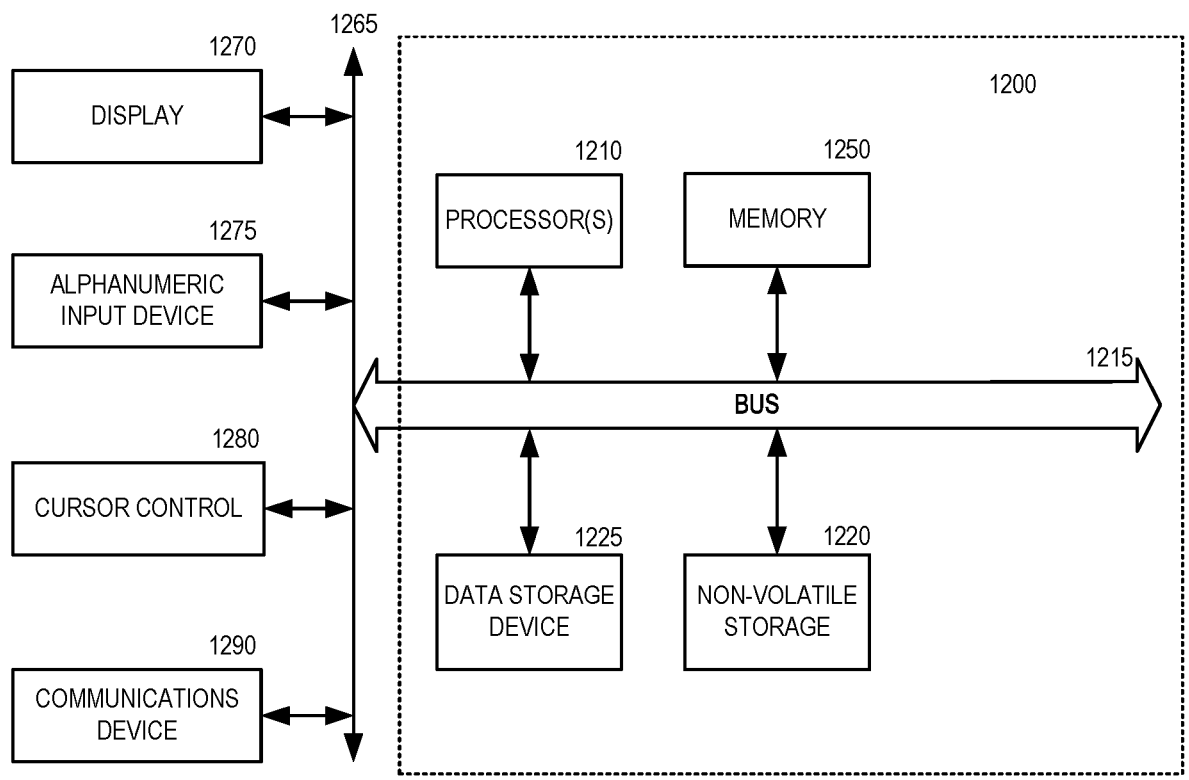
FIG. 12 is one embodiment of a computer system that may be used to support the systems and operations discussed herein.

FIG. 12 is one embodiment of a computer system that may be used to support the systems and operations discussed herein. In some examples, the computer system illustrated in FIG. 12 may be used by a commerce platform, a merchant development system, merchant user system, etc. It will be apparent to those of ordinary skill in the art, however that other alternative systems of various system architectures may also be used.

The data processing system illustrated in FIG. 12 includes a bus or other internal communication means 1215 for communicating information, and one or more processor(s) 1210 coupled to the bus 1215 for processing information. The system further comprises a random access memory (RAM) or other volatile storage device 1250 (referred to as memory), coupled to bus 1215 for storing information and instructions to be executed by processor 1210. Main memory 1250 also may be used for storing temporary variables or other intermediate information during execution of instructions by processor 1210. The system also comprises a read only memory (ROM) and/or static storage device 1220 coupled to bus 1215 for storing static information and instructions for processor 1210, and a data storage device 1225 such as a magnetic disk or optical disk and its corresponding disk drive. Data storage device 1225 is coupled to bus 1215 for storing information and instructions.

The system may further be coupled to a display device 1270, such as a light emitting diode (LED) display or a liquid crystal display (LCD) coupled to bus 1215 through bus 1265 for displaying information to a computer user. An alphanumeric input device 1275, including alphanumeric and other keys, may also be coupled to bus 1215 through bus 1265 for communicating information and command selections to processor 1210. An additional user input device is cursor control device 1280, such as a touchpad, mouse, a trackball, stylus, or cursor direction keys coupled to bus 1215 through bus 1265 for communicating direction information and command selections to processor 1210, and for controlling cursor movement on display device 1270.

Another device, which may optionally be coupled to computer system 1200, is a communication device 1290 for accessing other nodes of a distributed system via a network. The communication device 1290 may include any of a number of commercially available networking peripheral devices such as those used for coupling to an Ethernet, token ring, Internet, or wide area network. The communication device 1290 may further be a null-modem connection, or any other mechanism that provides connectivity between the computer system 1200 and the outside world. Note that any or all of the components of this system illustrated in FIG. 12 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 1250, mass storage device 1225, or other storage medium locally or remotely accessible to processor 1210.

It will be apparent to those of ordinary skill in the art that the system, method, and process described herein can be implemented as software stored in main memory 1250 or read only memory 1220 and executed by processor 1210. This control logic or software may also be resident on an article of manufacture comprising a computer readable medium having computer readable program code embodied therein and being readable by the mass storage device 1225 and for causing the processor 1210 to operate in accordance with the methods and teachings herein.

The embodiments discussed herein may also be embodied in a handheld or portable device containing a subset of the computer hardware components described above. In some examples, the handheld device may be configured to contain only the bus 1215, the processor 1210, and memory 1250 and/or 1225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. In some examples, the appliance may include a processor 1210, a data storage device 1225, a bus 1215, and memory 1250, and only rudimentary communications mechanisms, such as a small touch-screen that permits the user to communicate in a basic manner with the device. In general, the more special-purpose the device is, the fewer of the elements need be present for the device to function.

Exemplary methods, machine-readable media, and systems are set out in the following items:

1. A method of managing data by a distributed assets management platform, the method comprising:
   receiving, at an assets interface of the distributed assets management platform, a stream of event messages, wherein each event message of the stream of event messages is associated with at least one asset movement between accounts of a commerce platform and is associated with a service causing the at least one asset movement between the accounts;
   for a first event message of the stream of event messages:
      determining, by the assets interface, whether the first event message includes incomplete information;
      in response to a determination that the first event message includes incomplete information:
         registering, by a hydration system of the distributed assets management platform, at least one data field of the incomplete information associated with the first event message, and storing the first event message;
         updating, by the hydration system, the at least one data field with updated information to transform the first event message into a completed event message;
         generating, by the assets interface, a liquidity event message based on the completed event message for a periodic movement of assets between the accounts of the commerce platform based on one or more conditions associated with balances of the accounts of the commerce platform, the assets interface further transmitting the liquidity event message to a liquidity engine of the distributed assets management platform; and
         executing, by the liquidity engine, in response to receipt of the liquidity event message, the periodic movement of assets between the accounts of the commerce platform.

2. The method of item 1, further comprising:
   detecting, by the assets interface, an exchange exposure for at least one asset movement identified by the first event message;
   generating, by the assets interface, an exchange event message that defines the exchange exposure; and
   transmitting the exchange event message to an exchange platform, by the assets interface, the exchange event message causing the exchange platform to determine aggregated exchange exposure based on asset movements including the at least one asset movement identified by the first event message.

3. The method of item 2, wherein the exchange exposure is detected at least in part on a source account and a destination account being associated with different currencies, a debit amount from the source account and a credit amount in the destination account being in different currencies, or a combination thereof.

4. The method of any of items 2-3, further comprising:
   executing, by the exchange platform, at least one asset exchange based at least on an amount and accounts associated with the detected exchange exposure.

5. The method of any of items 2-4, wherein the distributed assets management platform comprises one or more instances of each of the assets interface, the hydration system, the liquidity engine, and the exchange platform, and wherein each of the one or more instances are executed by different processing resources of the distributed assets management platform.

6. The method of any of items 1-5, further comprising:
   for the first event message of the stream of event messages:
      in response to a determination that the first event message includes complete information, generating, by the assets interface, the liquidity event message from the complete information of the first event message for the periodic movement of assets between the accounts of the commerce platform.

7. The method of any of items 1-6, wherein the first event message of the stream of event messages comprises a globally unique identifier generated by a first service causing generation of the first event message.

8. The method of item 7, further comprising:
   monitoring, by the hydration system, a second stream of messages exchanged between services of the commerce platform to identify when a message in the second stream of messages includes first data corresponding to the at least one data field;
   transmitting, by the hydration system to the assets interface, the first data for the at least one data field; and
   updating the at least one data field with the first data to transform the first event message into the completed event message.

9. The method of any of items 1-8, wherein the first event message is the completed event message when the first event message includes at least a source account, a destination account, a debit amount and a credit amount.

10. A non-transitory machine readable medium having instructions stored thereon, which when executed by a processing system, causes the processing system to perform operations of a distributed assets management platform, the operations comprising:
   receiving, at an assets interface of the distributed assets management platform, a stream of event messages, wherein each event message of the stream of event messages is associated with at least one asset movement between accounts of a commerce platform and is associated with a service causing the at least one asset movement between the accounts;
   for a first event message of the stream of event messages:
      determining, by the assets interface, whether the first event message includes incomplete information;
      in response to a determination that the first event message includes incomplete information:
         registering, by a hydration system of the distributed assets management platform, at least one data field of the incomplete information associated with the first event message, and storing the first event message;
         updating, by the hydration system, a the at least one data field with updated information to transform the first event message into a completed event message;
         generating, by the assets interface, a liquidity event message based on the completed event message for a periodic movement of assets between the accounts of the commerce platform based on one or more conditions associated with balances of the accounts of the commerce platform, the assets interface further transmitting the liquidity event message to a liquidity engine of the distributed assets management platform; and executing, by the liquidity engine, in response to receipt of the liquidity event message, the periodic movement of assets between the accounts of the commerce platform.

11. A system, comprising:
a non-transitory memory storing instructions; and
a processing system coupled with the memory and configured to execute the instructions causing the system to perform operations, the operations comprising:
receiving, at an assets interface of the distributed assets management platform, a stream of event messages, wherein each event message of the stream of event messages is associated with at least one asset movement between accounts of a commerce platform and is associated with a service causing the at least one asset movement between the accounts;
for a first event message of the stream of event messages:
determining, by the assets interface, whether the first event message includes incomplete information;
in response to a determination that the first event message includes incomplete information:
registering, by a hydration system of the distributed assets management platform, at least one data field of the incomplete information associated with the first event message, and storing the first event message;
updating, by the hydration system, a the at least one data field with updated information to transform the first event message into a completed event message;
generating, by the assets interface, a liquidity event message based on the completed event message for a periodic movement of assets between the accounts of the commerce platform based on one or more conditions associated with balances of the accounts of the commerce platform, the assets interface further transmitting the liquidity event message to a liquidity engine of the distributed assets management platform; and
executing, by the liquidity engine, in response to receipt of the liquidity event message, the periodic movement of assets between the accounts of the commerce platform.

12. A system, comprising:
one or more processors;
a memory; and
one or more programs, wherein the one or more programs are stored in the memory and configured to be executed by the one or more processors, the one or more programs including instructions for performing the methods of any one of items 1-9.

13. A non-transitory machine-readable medium storing one or more programs, the one or more programs comprising instructions, which when executed by one or more processors of a system, cause the system to perform the methods of any one of items 1-9.

14. A system, comprising:
means for performing the methods of any one of items 1-9.

15. A method for providing an interface to a plurality of services, the method comprising:
receiving, by an assets interface of a distributed assets management platform, an event message associated with an operation requesting an asset movement between accounts of a commerce platform, the event message having a plurality of data fields corresponding to the asset movement and a first identifier;
accessing, by the assets interface, a configuration for the asset movement based on account identifiers for the accounts as defined in the plurality of data fields, the configuration defining one or more legs for execution of the asset movement;
transforming, by the assets interface, the event message to one or more asset movements corresponding to the one or more legs defined in the configuration;
generating, by the assets interface, one or more corresponding sub movement event messages for the one or more legs; and
transmitting, by the assets interface, at least one of the one or more corresponding sub movement event messages to a liquidity engine causing one or more asset movements between the accounts of the commerce platform.

16. The method of item 15, further comprising:
prior to receiving the event message:
receiving, by the assets interface, a feasibility message, the feasibility message associated with the operation requesting the asset movement between the accounts of the commerce platform;
determining, based on one or more blocking conditions, whether the asset movement between the accounts is permissible;
in response to determining that the asset movement is not permissible, transmitting a response message that indicates to a service requesting the operation that the asset movement is not feasible; and
in response to determining that the asset movement is permissible, generating a second identifier based on data in at least a subset of the plurality of data fields, and transmitting the response message to the service indicating that the asset movement is permissible.

17. The method of item 16, wherein the event message comprises the second identifier, and the method further comprises:
regenerating the second identifier from the plurality of data fields received in the event message;
in response to detecting that the regenerated second identifier matches the second identifier received with the event message, processing the event message by performing the accessing, the transforming, the generating, and the transmitting.

18. The method of any of items 15-17, wherein the plurality of data fields defining the asset movement requested by the event message comprise an application programming interface (API) data fields of a API message, and the plurality of data fields comprise: a source account identifier, a destination account identifier, a departed data field indicative of when assets can leave a source account, an arrival data field indicative of when assets are available at a destination account, a source amount to be debited from the source account, and an amount to be credited to the destination account.

19. The method of item 18, further comprising:
  detecting, for each of the one or more corresponding sub movement event messages, whether an exchange exposure has occurred; and
  for a sub movement event message for which an exchange exposure has occurred, generating and transmitting to an exchange platform the sub movement event message for which the exchange exposure has occurred, causing the exchange platform to execute an exchange based at least in part on the exchange exposure caused by the sub movement event message for which the exchange exposure has occurred.

20. The method of any of items 18-19, wherein the API message is received at an API endpoint exposed by the assets interface to a plurality of services.

21. The method of any of items 15-20, wherein a first data field of the plurality of data fields comprises a placeholder value, the placeholder value indicating a data value for the first data field is unknown at a time of receipt of the event message.

22. The method of item 21, further comprising:
  storing the event message in a data store of the assets interface, wherein the storing causes a delay in processing of the event message;
  generating and transmitting, from the assets interface to a hydration system, a registration request associated with the event message, the registration request comprising the first identifier and a third identifier that identifies the first data field;
  receiving, from the hydration system, a value for the first data field identified by the third identifier;
  updating the first data field to include the value received from the hydration system; and
  resuming processing of the event message after updating the first data field.

23. The method of any of items 15-22, wherein generating, by the assets interface, the one or more corresponding sub movement event messages for the one or more legs comprises generating at least two sub movement event messages defined in the configuration.

24. The method of item 23, comprising:
  generating a first sub movement event message to cause a first transfer of assets from a source account to an intermediate account, the source account identified within the plurality of data fields defining the asset movement, and the intermediate account identified in the configuration; and
  generating a second sub movement event message to cause a second transfer of assets from the intermediate account to a destination account, the destination account identified within the plurality of data fields defining the asset movement; and
  wherein the first sub movement event message and the second sub movement event message cause the first transfer of assets and the second transfer of assets to achieve the asset movement requested by the event message.

25. A non-transitory machine readable medium having instructions stored thereon, which when executed by a processing system, causes the processing system to perform operations for hydration of event data in a distributed assets management platform, the operations comprising:
  receiving, by an assets interface of a distributed assets management platform, an event message associated with an operation requesting an asset movement between accounts of a commerce platform, the event message having a plurality of data fields corresponding to the asset movement and a first identifier;
  accessing, by the assets interface, a configuration for the asset movement based on account identifiers for the accounts as defined in the plurality of data fields, the configuration defining one or more legs for execution of the asset movement;
  transforming, by the assets interface, the event message to one or more asset movements corresponding to the one or more legs defined in the configuration;
  generating, by the assets interface, one or more corresponding sub movement event messages for the one or more legs; and
  transmitting, by the assets interface, at least one of the one or more corresponding sub movement event messages to a liquidity engine causing one or more asset movements between the accounts of the commerce platform.

26. A system, comprising:
  a non-transitory memory storing instructions; and
  a processing system coupled with the memory and configured to execute the instructions causing the system to perform operations, the operations comprising:
  receiving, by an assets interface of a distributed assets management platform, an event message associated with an operation requesting an asset movement between accounts of a commerce platform, the event message having a plurality of data fields corresponding to the asset movement and a first identifier;
  accessing, by the assets interface, a configuration for the asset movement based on account identifiers for the accounts as defined in the plurality of data fields, the configuration defining one or more legs for execution of the asset movement;
  transforming, by the assets interface, the event message to one or more asset movements corresponding to the one or more legs defined in the configuration;
  generating, by the assets interface, one or more corresponding sub movement event messages for the one or more legs; and
  transmitting, by the assets interface, at least one of the one or more corresponding sub movement event messages to a liquidity engine causing one or more asset movements between the accounts of the commerce platform.

27. A system, comprising:
  one or more processors;
  a memory; and
  one or more programs, wherein the one or more programs are stored in the memory and configured to be executed by the one or more processors, the one or more programs including instructions for performing the methods of any one of items 15-24.

28. A non-transitory machine-readable medium storing one or more programs, the one or more programs comprising instructions, which when executed by one or more processors of a system, cause the system to perform the methods of any one of items 15-24.

29. A system, comprising:
  means for performing the methods of any one of items 15-24.

30. A method for hydration of an event message data at a distributed assets management platform, comprising:
  receiving, by a hydration system from an assets interface, a registration request associated with an event message, the event message identified by a first identifier and including a placeholder value for a data field of the event message that is unknown at a time the event message is generated;

receiving, from a first hydration data source, a candidate identifier and a set of data corresponding to the candidate identifier;
determining that the first identifier matches the candidate identifier; and
in response to determining that the first identifier matches the candidate identifier, updating, by the hydration system, the data field with a first data value of the set of data.

31. The method of item 30, further comprising:
in response to updating, by the hydration system, the data field, causing at least one of:
one or more liquidity engines to move assets based at least in part on the data field being updated, or
causing an exchange platform to perform a currency exchange based at least in part on the data field being updated.

32. The method of item 31, the method further comprising:
receiving, from a second hydration data source, a second data value associated with the first identifier;
determining whether the second hydration data source is preferred over the first hydration data source according to one or more predefined preferences; and
in response to determining that the second hydration data source is preferred over the first hydration data source, updating the data field with the second data value, wherein the second data value is a correction.

33. The method of item 32, wherein determining whether the second hydration data source is preferred over the first hydration data source according to the one or more predefined preferences, further comprises:
accessing a rule set maintained by the hydration system, the rule set comprising one or more rules defining preferences of hydration data sources relative to one another.

34. The method of item 33, wherein the hydration data sources comprise one or more of: a machine learning model based prediction system, a messaging interface for exchanging messages, a database operating external to the hydration system, a data store that maintains default values for data fields for event messages, or any combination thereof.

35. The method of any of items 33-34, wherein the one or more rules comprise one or more hierarchical rankings of the hydration data sources each indicative of an order of preference of the hydration data sources, and wherein a hierarchical ranking of the hydration data sources is selected from the one or more hierarchical rankings to determine whether the second hydration data source is preferred over the first hydration data source based at least in part on one or more of a type of an operation causing the event message, a third party associated with the event message, and a product or service causing the event message.

36. The method of any of items 32-33, wherein the event message is stored in a data store of the hydration system for a predetermined period of time, and wherein the second data value is received after the first data value within the predetermined period of time.

37. The method of any of items 30-36, wherein the data field that is unknown at the time the event message is generated comprises at least one of:
a departed-at data field indicative of a time at which assets can depart a source account associated with the event message, or
an arrival-by data field indicative of when assets are to arrive at a destination account associated with the event message.

38. The method of any of items 30-37, wherein updating, by the hydration system, the data field with the first data value of the set of data includes:
determining that the first data value corresponds to the data field of the event message that is unknown at the time the event message is generated.

39. A non-transitory machine readable medium having instructions stored thereon, which when executed by a processing system, causes the processing system to perform operations for hydration of event data in a distributed assets management platform, the operations comprising:
receiving, by a hydration system from an assets interface, a registration request associated with an event message, the event message identified by a first identifier and including a placeholder value for a data field of the event message that is unknown at a time the event message is generated;
receiving, from a first hydration data source, a candidate identifier and a set of data corresponding to the candidate identifier;
determining that the first identifier matches the candidate identifier; and
in response to determining that the first identifier matches the candidate identifier, updating, by the hydration system, the data field with a first data value of the set of data.

40. A system, comprising:
a non-transitory memory storing instructions; and
a processing system coupled with the memory and configured to execute the instructions causing the system to perform operations, the operations comprising:
receiving, by a hydration system from an assets interface, a registration request associated with an event message, the event message identified by a first identifier and including a placeholder value for a data field of the event message that is unknown at a time the event message is generated;
receiving, from a first hydration data source, a candidate identifier and a set of data corresponding to the candidate identifier;
determining that the first identifier matches the candidate identifier; and
in response to determining that the first identifier matches the candidate identifier, updating, by the hydration system, the data field with a first data value of the set of data.

41. A system, comprising:
one or more processors;
a memory; and
one or more programs, wherein the one or more programs are stored in the memory and configured to be executed by the one or more processors, the one or more programs including instructions for performing the methods of any one of items 30-38.

42. A non-transitory machine-readable medium storing one or more programs, the one or more programs comprising instructions, which when executed by one or more processors of a system, cause the system to perform the methods of any one of items 30-38.

43. A system, comprising:
means for performing the methods of any one of items 30-38.

44. A method for asset exchange management, comprising:
receiving, by an application programming interface (API) endpoint of an exchange platform, an API event message that defines a first amount of a first type of asset and a second amount of a second type of asset;

processing, by an aggregator of the exchange platform, the API event message to accumulate a total amount of the first type of asset and a total amount of the second type of asset in response to receipt of the API event message;

detecting, by an exchange manager of the exchange platform, when at least one of the total amount of the first type of asset and the total amount of the second type of asset satisfies a condition defining when a second amount of the first type of asset is to be converted to the second type of asset; and in response to detecting satisfaction of the condition, initiating a process by which a remote system converts the second amount of the first type of asset to the second type of asset.

45. The method of item 44, wherein the first type of asset is stored in a first geographic location, the second type of asset is stored in a second geographic location, and a conversion of the second amount of the first type of asset to the second type of asset comprises:

reducing the total amount of the first type of asset stored in the first geographic location by the second amount of the first type of asset;

converting the second amount of the first type of asset to a converted amount of the second type of asset using the remote system; and increasing the total amount of the second type of asset stored in the second geographic location by the converted amount of the second type of asset.

46. The method of any of items 44-45, wherein the processing of the API event message by the aggregator is performed on a first periodic basis to process a plurality of new API exchange event messages that are received by the API endpoint of the exchange platform.

47. The method of item 46, wherein the exchange manager detects the condition on a second periodic basis, and wherein a period of the first periodic basis is less than a period of the second periodic basis.

48. The method of any of items 44-47, further comprises:
storing, in a data store, a record of a completion of a process that converted the second amount of the first type of asset to the second type of asset; and
in response to a user request, generating a graphical user interface to display data indicative of the conversion.

49. The method of any of items 44-48, further comprising:
generating a graphical user interface with a current configuration of the condition;
receiving, via the graphical user interface, a new configuration of the condition that is different from the current configuration of the condition; and
performing the detection of at least one of the total amount of the first type of asset and the total amount of the second type of asset satisfying the condition based on the new configuration of the condition.

50. The method of any of items 44-49, wherein the condition comprises an amount threshold indicative of a maximum total amount of the first type of asset and/or a maximum total amount of the second type of asset.

51. The method of any of items 44-50, wherein the condition comprises a volatility threshold value indicative of fluctuation indicative of a conversion parameter of a conversion to be processed using the remote system.

52. The method of any of items 44-51, wherein the condition comprises an anomaly threshold that defines a maximum total amount based on a historical total amount of the first type of asset and/or a historical total amount of the second type of asset.

53. The method of any of items 44-52, further comprising:
generating, by the exchange manager, a liquidity event message based on the conversion of the second amount of the first type of asset to the second type of asset; and
transmitting, from the exchange platform, the liquidity event message to a liquidity engine for a periodic movement of assets between accounts.

54. A non-transitory machine readable medium may have instructions stored thereon, which when executed by a processing system, causes the processing system to perform operations for asset exchange management, the operations comprising:

receiving, by an application programming interface (API) endpoint of an exchange platform, an API event message that defines a first amount of a first type of asset and a second amount of a second type of asset;

processing, by an aggregator of the exchange platform, the API event message to accumulate a total amount of the first type of asset and a total amount of the second type of asset in response to receipt of the API event message;

detecting, by an exchange manager of the exchange platform, when at least one of the total amount of the first type of asset and the total amount of the second type of asset satisfies a condition defining when a second amount of the first type of asset is to be converted to the second type of asset; and in response to detecting satisfaction of the condition, initiating a process by which a remote system converts the second amount of the first type of asset to the second type of asset.

55. A system, comprising:
a non-transitory memory storing instructions; and
a processing system coupled with the memory and configured to execute the instructions causing the system to perform operations, the operations comprising:

receiving, by an application programming interface (API) endpoint of an exchange platform, an API event message that defines a first amount of a first type of asset and a second amount of a second type of asset;

processing, by an aggregator of the exchange platform, the API event message to accumulate a total amount of the first type of asset and a total amount of the second type of asset in response to receipt of the API event message;

detecting, by an exchange manager of the exchange platform, when at least one of the total amount of the first type of asset and the total amount of the second type of asset satisfies a condition defining when a second amount of the first type of asset is to be converted to the second type of asset; and in response to detecting satisfaction of the condition, initiating a process by which a remote system converts the second amount of the first type of asset to the second type of asset.

56. A system, comprising:
one or more processors;
a memory; and
one or more programs, wherein the one or more programs are stored in the memory and configured to be executed by the one or more processors, the one or more programs including instructions for performing the methods of any one of items 44-53.

57. A non-transitory machine-readable medium storing one or more programs, the one or more programs comprising instructions, which when executed by one or more processors of a system, cause the system to perform the methods of any one of items 44-53.

58. A system, comprising:
means for performing the methods of any one of items 44-53.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purposes of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method of managing data by a distributed assets management platform, the method comprising:
   receiving, via an event messaging interface of the distributed assets management platform, a stream of event messages, wherein each event message of the stream of event messages comprises a plurality of data fields comprising a first data field comprising a unique identifier of the event message, one or more second data fields that define at least one asset movement between accounts of a commerce platform, and a third data field that identifies a service causing the at least one asset movement between the accounts;
   for a first event message of the stream of event messages:
      determining, by the event messaging interface, that the one or more second data fields of the first event message comprises first incomplete information and storing the first event message in a memory of the event messaging interface;
      executing, by the event messaging interface, a lookup at a system that generated the event message that obtains the first information associated with the one or more second data fields and adds the first information to the first event message to transform the first event message into a completed event message:
      transmitting, from the event messaging interface, the first event message to an assets interface of the distributed assets management platform;
      in response to a determination by the assets interface that the first event message includes second incomplete information:
         registering, by the assets interface with a hydration system of the distributed assets management platform, the unique identifier from the first data field and a fourth data field that comprises the second incomplete information associated with the first event message, and storing the first event message in a memory of the assets interface;
         obtaining, by the hydration system, second information based on G) extracting the second information from a message having the unique identifier that is exchanged on an event messaging bus of the distributed assets management platform and/or (ii) generating a prediction of the second information based on the first information in the one or more second data fields; and
         updating, by the hydration system, the at least one data field of the first event message with the second information in the memory
      generating, by the assets interface, a liquidity event message b for a periodic movement of assets between the accounts of the commerce platform based on one or more conditions associated with balances of the accounts of the commerce platform, the assets interface further transmitting the liquidity event message to a liquidity engine of the distributed assets management platform; and
      executing, by the liquidity engine, in response to receipt of the liquidity event message, the periodic movement of assets between the accounts of the commerce platform.

2. The method of claim 1, further comprising:
detecting, by the assets interface, an exchange exposure for at least one asset movement identified by the first event message;
generating, by the assets interface, an exchange event message that defines the exchange exposure; and
transmitting the exchange event message to an exchange platform, by the assets interface, the exchange event message causing the exchange platform to determine aggregated exchange exposure based on asset movements including the at least one asset movement identified by the first event message.

3. The method of claim 2, wherein the exchange exposure is detected at least in part on a source account and a destination account being associated with different currencies, a debit amount from the source account and a credit amount in the destination account being in different currencies, or a combination thereof.

4. The method of claim 2, further comprising:
executing, by the exchange platform, at least one asset exchange based at least on an amount and accounts associated with the detected exchange exposure.

5. The method of claim 2, wherein the distributed assets management platform comprises one or more instances of each of the assets interface, the hydration system, the liquidity engine, and the exchange platform, and wherein each of the one or more instances are executed by different processing resources of the distributed assets management platform.

6. The method of claim 1, further comprising:
for the first event message of the stream of event messages:
in response to a determination that the first event message includes complete information, generating, by the assets interface, the liquidity event message from the complete information of the first event message for the periodic movement of assets between the accounts of the commerce platform.

7. The method of claim 1, wherein the first event message of the stream of event messages comprises a globally unique identifier generated by a first service causing generation of the first event message.

8. The method of claim 7, further comprising:
monitoring, by the hydration system, a second stream of messages exchanged between services of the commerce platform to identify when a message in the second stream of messages includes second information corresponding to the at least one data field;
transmitting, by the hydration system to the assets interface, the second information for the at least one data field; and
updating the at least one data field with the second information.

9. The method of claim 1, wherein a second event message received via the event messaging interface is a second completed event message when the second event message includes at least a source account, a destination account, a debit amount and a credit amount.

10. A non-transitory machine readable medium having instructions stored thereon, which when executed by a processing system, causes the processing system to perform operations of a distributed assets management platform, the operations comprising:
receiving, at via an event messaging interface of the distributed assets management platform, a stream of event messages, wherein each event message of the stream of event messages comprises a plurality of data fields comprising a first data field comprising a unique identifier of the event message, one or more second data fields that define at least one asset movement between accounts of a commerce platform, and a third data field that identifies a service causing the at least one asset movement between the accounts;
for a first event message of the stream of event messages:
determining, by the event messaging interface, that the one of more second data fields of the first event message comprises first incomplete information and storing the first event message in a memory of the event messaging interface;
executing, by the event messaging interface, a lookup at a system that generated the event message that obtains the first information associated with the one or more second data fields and adds the first information to the first event message to transform the first event message into a completed event message;
transmitting, from the event messaging interface, the first event message to an assets interface of the distributed assets management platform;
in response to a determination by the assets interface that the first event message includes second incomplete information:
registering, by the assets interface with a hydration system of the distributed assets management platform, the unique identifier from the first data field and at fourth data field of that comprises the second incomplete information associated with the first event message, and storing the first event message in a memory of the assets interface;
obtaining, by the hydration system, second information based on G) extracting the second information from a message having the unique identifier that is exchanged on an event messaging bus of the distributed assets management platform and/or (ii) generating a prediction of the second information based on the first information in the one or more second data fields; and
updating, by the hydration system, the at least one data field of the first event message with updated the second information in the memory;
generating, by the assets interface, a liquidity event message for a periodic movement of assets between the accounts of the commerce platform based on one or more conditions associated with balances of the accounts of the commerce platform, the assets interface further transmitting the liquidity event message to a liquidity engine of the distributed assets management platform; and
executing, by the liquidity engine, in response to receipt of the liquidity event message, the periodic movement of assets between the accounts of the commerce platform.

11. The non-transitory machine readable medium of claim 10, further comprising:
detecting, by the assets interface, an exchange exposure for at least one asset movement identified by the first event message;
generating, by the assets interface, an exchange event message that defines the exchange exposure; and
transmitting the exchange event message to an exchange platform, by the assets interface, the exchange event message causing the exchange platform to determine aggregated exchange exposure based on asset movements including the at least one asset movement identified by the first event message.

12. The non-transitory machine readable medium of claim 11, wherein the exchange exposure is detected at least in part on a source account and a destination account being associated with different currencies, a debit amount from the source account and a credit amount in the destination account being in different currencies, or a combination thereof.

13. The non-transitory machine readable medium of claim 11, the operations comprising:
executing, by the exchange platform, at least one asset exchange based at least on an amount and accounts associated with the detected exchange exposure.

14. The non-transitory machine readable medium of claim 11, wherein the distributed assets management platform comprises one or more instances of each of the assets interface, the hydration system, the liquidity engine, and the exchange platform, and wherein each of the one or more instances are executed by different processing resources of the distributed assets management platform.

15. The non-transitory machine readable medium of claim 10, the operations further comprising:
for the first event message of the stream of event messages:
in response to a determination that the first event message includes complete information, generating, by the assets interface, the liquidity event message from the complete information of the first event message for the periodic movement of assets between the accounts of the commerce platform.

16. A system, comprising:
a non-transitory memory storing instructions; and
a processing system coupled with the memory and configured to execute the instructions causing the system to perform operations, the operations comprising:
receiving, via an event messaging interface of the distributed assets management platform, a stream of event messages, wherein each event message of the stream of event messages comprises a plurality of data fields comprising a first data field comprising a unique identifier of the event message, one or more second data fields that define at least one asset movement between accounts of a commerce platform, and a third data field that identifies a service causing the at least one asset movement between the accounts;

for a first event message of the stream of event messages:
  determining, by the event messaging interface, that the one or more second data fields of the first event message comprises first incomplete information and storing the first event message in a memory of the event messaging interface;
  executing by the event messaging interface, a lookup at a system that generated the event message that obtains the first information associated with the one or more second data fields and adds the first information to the first event message to transform the first event message into a completed event message;
  transmitting, from the event messaging interface, the first event message to an assets interface of the distributed assets management platform;
  in response to a determination by the assets interface that the first event message includes second incomplete information:
    registering, by the assets interface with a hydration system of the distributed assets management platform, the unique identifier from the first data field and a fourth data field of that comprises the second incomplete information associated with the first event message, and storing the first event message in a memory of the assets interface;
    obtaining, by the hydration system, second information based on (i) extracting the second information from a message having the unique identifier that is exchanged on an event messaging bus of the distributed assets management platform and/or (ii) generating a prediction of the second information based on the first information in the one or more second data fields, and
    updating, by the hydration system, the at least one data field of the first event message with the second information in the memory;
  generating, by the assets interface, a liquidity event message for a periodic movement of assets between the accounts of the commerce platform based on one or more conditions associated with balances of the accounts of the commerce platform, the assets interface further transmitting the liquidity event message to a liquidity engine of the distributed assets management platform; and
  executing, by the liquidity engine, in response to receipt of the liquidity event message, the periodic movement of assets between the accounts of the commerce platform.

17. The system of claim 16, the operations further comprising:
  detecting, by the assets interface, an exchange exposure for at least one asset movement identified by the first event message;
  generating, by the assets interface, an exchange event message that defines the exchange exposure; and
  transmitting the exchange event message to an exchange platform, by the assets interface, the exchange event message causing the exchange platform to determine aggregated exchange exposure based on asset movements including the at least one asset movement identified by the first event message.

18. The system of claim 17, wherein the exchange exposure is detected at least in part on a source account and a destination account being associated with different currencies, a debit amount from the source account and a credit amount in the destination account being in different currencies, or a combination thereof.

19. The system of claim 17, the operations further comprising:
  executing, by the exchange platform, at least one asset exchange based at least on an amount and accounts associated with the detected exchange exposure.

20. The system of claim 17, wherein the distributed assets management platform comprises one or more instances of each of the assets interface, the hydration system, the liquidity engine, and the exchange platform, and wherein each of the one or more instances are executed by different processing resources of the distributed assets management platform.

* * * * *